(12) United States Patent
Fu et al.

(10) Patent No.: US 12,427,497 B2
(45) Date of Patent: Sep. 30, 2025

(54) ADSORPTION OF CARBON DIOXIDE FROM LOW CONCENTRATION CARBON DIOXIDE CONTENT SOURCES WITH MAZZITE ZEOLITES

(71) Applicant: California Institute of Technology, Pasadena, CA (US)

(72) Inventors: Donglong Fu, Pasadena, CA (US); Mark E. Davis, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 429 days.

(21) Appl. No.: 18/165,043

(22) Filed: Feb. 6, 2023

(65) Prior Publication Data
US 2023/0249152 A1    Aug. 10, 2023

Related U.S. Application Data

(60) Provisional application No. 63/306,608, filed on Feb. 4, 2022.

(51) Int. Cl.
| | | |
|---|---|---|
| *B01D 53/02* | (2006.01) | |
| *B01D 53/04* | (2006.01) | |
| *B01D 53/26* | (2006.01) | |
| *B01J 20/18* | (2006.01) | |
| *B01J 20/30* | (2006.01) | |
| *C01B 39/02* | (2006.01) | |
| *C01B 39/48* | (2006.01) | |

(52) U.S. Cl.
CPC ............ *B01J 20/186* (2013.01); *B01D 53/04* (2013.01); *B01D 53/261* (2013.01); *B01J 20/3057* (2013.01); *B01J 20/3078* (2013.01); *B01J 20/3085* (2013.01); *C01B 39/026* (2013.01); *C01B 39/48* (2013.01); *B01D 2253/108* (2013.01); *B01D 2257/504* (2013.01); *B01D 2257/80* (2013.01); *C01P 2002/77* (2013.01)

(58) Field of Classification Search
CPC ........ B01D 2253/108; B01D 2257/504; B01D 2257/80; B01D 53/02; B01D 53/04; B01D 53/261; B01J 20/18; B01J 20/186; B01J 20/3057; B01J 20/3078; B01J 20/3085; C01B 39/026; C01B 39/48; C01P 2002/77; Y02C 20/40
See application file for complete search history.

(56) References Cited

U.S. PATENT DOCUMENTS 6,468,501 B1 * 10/2002 Chen .................. C01B 39/026
 502/61
9,617,164 B2 * 4/2017 Corcoran, Jr. .......... C01B 39/06
(Continued)

OTHER PUBLICATIONS

Baerlocher et al., "Charge Flipping combined with histogram matching to solve complex crystal structures from powder diffraction data", Atlas of Zeolite Framework Types, Sixth Revised Edition, 2007.

(Continued)

*Primary Examiner* — Christopher P Jones
(74) *Attorney, Agent, or Firm* — Merchant & Gould P.C.

(57) ABSTRACT

The present disclosure is directed to metal ion-containing zeolitic compositions having MAZ topology that are useful for scavenging $CO_2$ from low-$CO_2$-content feed streams, including air, and method of making and using the same.

26 Claims, 14 Drawing Sheets

(56) References Cited

U.S. PATENT DOCUMENTS

| | | | |
|---|---|---|---|
| 2005/0234279 A1* | 10/2005 | Serra | C07C 6/126 |
| | | | 585/475 |
| 2009/0093661 A1* | 4/2009 | Guillon | C07C 5/2708 |
| | | | 502/67 |
| 2017/0022129 A1* | 1/2017 | Salciccioli | C07C 41/09 |
| 2018/0257019 A1* | 9/2018 | Thompson | B01J 29/70 |
| 2018/0362357 A1* | 12/2018 | Feyen | B01J 20/18 |
| 2019/0248662 A1* | 8/2019 | Vennestrøm | B01D 53/9418 |
| 2019/0276324 A1* | 9/2019 | Vennestrøm | C01B 39/023 |
| 2021/0024436 A1* | 1/2021 | Awadh | B01J 35/647 |
| 2021/0054512 A1* | 2/2021 | Abo-Hashema | C25B 3/23 |
| 2021/0214237 A1* | 7/2021 | Rimer | C01B 39/265 |
| 2022/0212163 A1* | 7/2022 | Barrier | B01D 53/02 |
| 2022/0274088 A1* | 9/2022 | Fu | B01D 53/02 |
| 2022/0280912 A1* | 9/2022 | Fu | B01J 20/2808 |

OTHER PUBLICATIONS

Fu et al., "Zinc Containing Small-Pore Zeolites for Capture of Low Concentration Carbon Dioxide", Angewandte Chemie Int. Ed., 2022, 61, 49 pages, e202112916.

Hakiki et al., "Correlation of Hydrophilic character and surface basicity of exchanged omego-catalyzed MCR process", Thermochim. Acta., 2018, 662, 108-115.

Perrotta et al., "The synthesis, characterization, and catalytic activity of omega and ZSM-4 zeolites", J. Catal., 1978, 55, 240-249.

Terrab et al., "Insights in CO2 interaction on zeolite omega-supported polyol dendrimers", Thermochim. Acta., 2016, 624, 95-101.

\* cited by examiner

P=1 (MAZ3): Li>Na>Cu
P=0.0004 (MAZ3): Li>Na>Cu

Adsorption conditions: 30 °C, flow rate 20 mL/min, 500 mg zeolites; $CO_2$/He or $CO_2/N_2/O_2$
Desorption conditions: 500 min at 60 °C, or 120 min at 550 °C

| Cation | Uptake (mmol/g) | |
|---|---|---|
| | 1 bar | 400 ppm |
| Na-MAZ3(CIT) | 4.06 | 0.65 |
| Na | 3.01 | 0.51 |
| Cu-Air-550C | 2.43 | 0.13 |
| Cu-Air-580C | 2.78 | 0.13 |
| Cu-He | 2.28 | 0.17 |
| Li | 3.80 | 0.60 |
| Na-(CIT) | 4.06 | 0.65 |
| Li-2IE | 2.58 | 0.31 |

ADSORPTION OF CARBON DIOXIDE FROM LOW CONCENTRATION CARBON DIOXIDE CONTENT SOURCES WITH MAZZITE ZEOLITES

CROSS REFERENCE TO RELATED APPLICATIONS

This application claims the benefit of U.S. Provisional Application No. 63/306,608, filed Feb. 4, 2022. The aforementioned application is incorporated by reference herein in its entirety.

TECHNICAL FIELD

The present disclosure is directed to metal ion-containing zeolitic compositions, that are useful for scavenging carbon dioxide ($CO_2$) from low-$CO_2$-content gaseous source mixtures, including air with or without water ($H_2O$), and methods of making and using the same. In some preferred embodiments, the compositions comprise metal ion-doped zeolites having Mazzite (MAZ) topology capable of efficiently removing carbon dioxide from low-$CO_2$-content gaseous source mixtures, including air.

BACKGROUND

The ever-increasing concentration of carbon dioxide ($CO_2$) is the primary cause of climate change. One of the most important approaches to combat the climate change is capture of $CO_2$ from a variety of emission sources. Although many adsorbents have been developed for the applications in high concentration $CO_2$ sources, they may not perform well for the adsorption of low concentration $CO_2$. A representative scenario for the latter case is direct capture of ca. 400 ppm $CO_2$ from atmospheric air (DAC), which is believed to be a necessary way to reach the goal of net-negative emissions. Carbon capture of low concentration $CO_2$ is also important for maintaining healthy environment in enclosed spaces, such as space stations, submarines, classrooms, etc., where the concentration is normally between 1000-3000 ppm. Therefore, it is of high significance to explore efficient adsorbents specifically for the use in the low concentration scenarios.

Zeolites are microporous aluminosilicate crystallite materials that have a proven track record for industrial applications in adsorption, catalysis, etc. They are also promising $CO_2$ adsorbents due to their fast kinetics and low regeneration energy (primarily through physisorption). Low silica zeolites, e.g. 13×, with Si/Al=ca. 1.2 have been studied for the adsorption of low concentration $CO_2$. However, they may be suffering from low thermostability and high water affinity as a result of the high aluminum content, which significantly compromise the performance of these materials for realistic conditions. Previously, we developed zinc containing small pore zeolites for the adsorption of low concentration $CO_2$ (D. Fu, Y. Park and M. E. Davis, "Zinc Containing Small-Pore Zeolites for Capture of Low Concentration Carbon Dioxide", *Angew Chem. Int. Ed.*, 2022, 61, e202112916).

SUMMARY

Zeolites are a class of microporous aluminosilicate crystallites with numerous framework topologies. The disclosure herein demonstrates that zeolites with the MAZ framework constituting twelve membered-ring (12-MR) channels and 8-MR cages can selectively adsorb $CO_2$ from $N_2$ and $O_2$ containing gases, e.g. air. The disclosure shows that the MAZ3 zeolite adsorbs more $CO_2$ than 13× zeolites in the low concentration range. The disclosure demonstrates that MAZ3 outperforms 13× zeolites with higher capacity, selectivity, and faster kinetics for the adsorption of $CO_2$ from simulated gas streams. The highest $CO_2$ uptake obtained for the MAZ3 zeolite is 0.65 mmol/g for the adsorption of 400 ppm $CO_2$.

In some aspects, the disclosure provides metal ion-doped crystalline microporous aluminosilicate compositions comprising: a three-dimensional aluminosilicate framework having Mazzite topology comprising 12-MR channels and 8-MR cages; wherein the crystalline microporous aluminosilicate contains 2.5 to 14 metal ions per unit cell, wherein the ratio of silicon to aluminum within the unit cell is about 2 to about 4; and wherein the metal ion-doped crystalline microporous aluminosilicate composition adsorbs carbon dioxide when exposed to a gaseous mixture comprising $CO_2$.

In other aspects, the disclosure provides methods of capturing carbon dioxide from a gaseous source mixture that comprises carbon dioxide, the method comprising contacting the gaseous source mixture with the above metal ion-doped crystalline microporous aluminosilicates such that carbon dioxide in the gaseous source mixture is adsorbed by the metal ion-doped crystalline microporous aluminosilicate.

In other aspects, the disclosure provides methods of capturing carbon dioxide from a humid gaseous source mixture that comprises water and carbon dioxide, wherein the method comprises contacting the gaseous source mixture first with a desiccant, then with the above metal ion-doped crystalline microporous aluminosilicate, such that water in the gaseous source mixture is adsorbed by the desiccant and carbon dioxide in the gaseous source mixture is adsorbed by the metal ion-doped crystalline microporous aluminosilicate.

DETAILED DESCRIPTION OF ILLUSTRATIVE EMBODIMENTS

Figure 1:
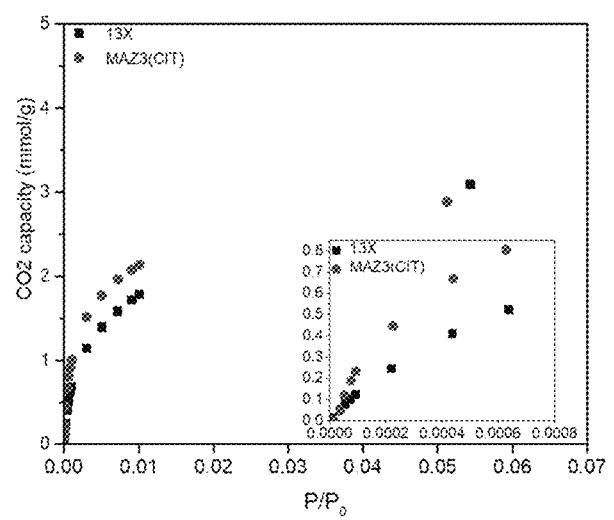
FIG. 1 shows low pressure $CO_2$ isotherms of MAZ3(CIT) and 13× zeolites at 25° C. Insert shows the zoom-in results for the $CO_2$ pressure range relevant to direct air capture. MAZ3(CIT) denotes the MAZ3 zeolite synthesized at Caltech.

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. In some cases, the term "about" encompasses the stated value ±5% of the stated value. In other cases, the term "about" encompasses the stated value ±10% of the stated value. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range. For example, a range defined as from 400 to 450 ppm includes 400 ppm and 450 ppm as independent embodiments.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

The transitional terms "comprising," "consisting essentially of," and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those which are independently described in terms of "consisting of" and "consisting essentially of." For those embodiments provided in terms of "consisting essentially of," the basic and novel characteristic(s) is the facile operability of the methods or compositions/systems to provide the aluminosilicate compositions at meaningful yields (or the ability of the systems using only those ingredients listed. Other components or steps may be included, as long as these additional components or steps do not materially affect the basic and novel characteristic(s) of the claimed invention.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C," as separate embodiments, as well as C1-3.

Throughout this specification, words are to be afforded their normal meaning, as would be understood by those skilled in the relevant art. However, to avoid misunderstanding, the meanings of certain terms will be specifically defined or clarified.

The terms "method(s)" and "process(es)" are considered interchangeable within this disclosure.

The terms "separating" or "separated" carry their ordinary meaning as would be understood by the skilled artisan, insofar as they connote physically partitioning or isolating of one material from another or the selective capture of one component from a broader mixture. For example, in the case where the terms are used in the context of gas processing, the terms "separating" or "separated" connote a partitioning of the gases by adsorption or by permeation based on size or physical or chemical properties, as would be understood by those skilled in the art.

In the context of $CO_2$ content in a gaseous source mixture, the terms "low concentration" or "low-$CO_2$-content" refers to embodiments where the $CO_2$ content of is in a range of from 100 ppm to 1000 ppm, or more preferably in an amount approximating the content of $CO_2$ in our atmosphere (i.e., ca. 400 ppm), but also the higher levels found in, e.g., buildings of process streams. In some specific embodiments, the $CO_2$ content in a gaseous source mixture may range from 300 to 350 ppm, 350 to 400 ppm, 400 to 450 ppm, 450 to 500 ppm, 500 to 600 ppm, 600 to 700 ppm, 700 to 800 ppm, 800 to 900 ppm, 900 to 1000 ppm, or the $CO_2$ content may be defined in terms of any of the foregoing values or two or more of the foregoing ranges. The term "gaseous source mixture" or the like refers to the gas from which the $CO_2$ is being extracted, typically air or, in the case of testing, helium, optionally in the presence of argon present as an internal standard. The gaseous source mixture is typically present at ambient atmospheric pressure (i.e., 101 kPa) or within 10% or 20% of that pressure, though higher pressures (i.e., up to 350 kPa) or lower pressures (i.e., down to 50 kPa) may also be considered in the present context.

The term "microporous," according to IUPAC notation refers to a material having pore diameters of less than 2 nm. Similarly, the term "macroporous" refers to materials having pore diameters of greater than 50 nm. And the term "mesoporous" refers to materials whose pore sizes are intermediate between microporous and macroporous. Within the context of the present disclosure, the material properties and applications depend on the properties of the framework such as pore size and dimensionality, cage dimensions and material composition.

"Optional" or "optionally" means that the subsequently described circumstance may or may not occur, so that the description includes instances where the circumstance occurs and instances where it does not. For example, the phrase "optionally heated" refers to both embodiments where the material is and is not heated. Similarly, the term "optionally present" refers to both embodiments where the component is and is not present. Each of these embodiments (is and is not heated or is and is not present) represents individual and independent embodiments.

As used herein, the term "crystalline microporous solids" or "crystalline microporous aluminosilicate" are crystalline structures having very regular pore structures of molecular dimensions, i.e., under 2 nm. The maximum size of the species that can enter the pores of a crystalline microporous solid is controlled by the dimensions of the openings. These materials are sometimes referred to as "molecular sieves," having very regular pore structures of molecular dimensions, i.e., under 2 nm. The term "molecular sieve" refers to the ability of the material to selectively sort molecules based primarily on a size exclusion process. The maximum size of the species that can enter the pores of a crystalline microporous solid is controlled by the dimensions of the openings. These are conventionally defined by the ring size of the aperture, where, for example, the term "8-MR" or "8-membered ring" refers to a closed loop that is typically built from eight tetrahedrally coordinated silicon (or aluminum) atoms and 8 oxygen atoms. These rings are not necessarily symmetrical, due to a variety of effects including strain induced by the bonding between units that are needed to produce the overall structure, or coordination of some of the oxygen atoms of the rings to cations within the structure. As used herein, in the context of the invention, the term "8-MR" or 8-MR zeolite" refers only to those aluminosilicate crystalline materials, or optionally substituted derivatives, having frameworks comprising 8-membered rings as the largest ring for entrance of molecules into the intracrystalline void space. Exemplary structures can identified in Baerlocher, et al., Atlas of Zeolite Framework Types, Sixth Revised Edition (2007), this reference being incorporated by reference herein for this teaching.

The term "metal ion-doped" is intended to confer the same meaning as "metal ion-containing" in the context of the metal ions set forth elsewhere herein.

The term "silicate" refers to any composition including silicate (or silicon oxide) within its framework. It is a general term encompassing, for example, pure-silica (i.e., absent other detectable metal oxides within the framework), aluminosilicate, borosilicate, ferrosilicate, germanosilicate, stannosilicate, titanosilicate, or zincosilicate structures. The term "aluminosilicate" refers to any composition including both silicon and aluminum oxides within its framework. The term "zeolite" refers to an aluminosilicate composition that is a member of this family. For this reason, the terms "metal ion-doped zeolitic composition(s)" and "metal ion-doped crystalline microporous aluminosilicate composition(s)" are considered equivalent and are used interchangeably herein. Such aluminosilicates may be "pure-aluminosilicates (i.e., absent other detectable metal oxides within the framework) or optionally substituted (i.e., containing other metal oxides within the lattice framework). When described as "optionally substituted," the respective framework may contain boron, gallium, germanium, hafnium, iron, tin, titanium, indium, vanadium, zinc, zirconium, or other atoms substituted for one or more of the atoms not already contained in the parent lattice or framework.

In some cases herein, the term "metal ion-doped crystalline microporous aluminosilicate compositions" are referred to as "zeolitic compositions" or "metal-doped zeolitic compositions," and the like.

The present disclosure is directed to new compositions of matter useful for extracting carbon dioxide ($CO_2$) from feed streams, especially feed streams containing low levels of $CO_2$, including air. Such new compositions comprise metal-containing zeolites, including those zeolites having the framework characteristics set forth herein, and preferably those compositions where the metal is an alkali or alkaline earth metal and the zeolites have MOR topologies. The disclosure is also directed to methods of making and using these compositions, including configurations useful for using these compositions to extract the $CO_2$ from gaseous feed streams.

The present invention may be understood more readily by reference to the following description taken in connection with the accompanying Figures and Examples, all of which form a part of this disclosure. It is to be understood that this invention is not limited to the specific products, methods, conditions, or parameters described or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. For example, though the some of the present disclosure comments on the placement of the metal ions in the zeolitic framework, the present inventions are not constrained by the correctness or incorrectness of these comments as to the placement. Throughout this text, it is recognized that the descriptions refer to compositions and methods of using said compositions. That is, where the disclosure describes or claims a feature or embodiment associated with a composition or a method of making or using a composition, it is appreciated that such a description or claim is intended to extend these features or embodiment to embodiments in each of these contexts (i.e., compositions, methods of making, and methods of using).

The disclosure herein demonstrates that Mazzite (MAZ) zeolites with Si/Al=ca. 3 (trade name Omega zeolite, denoted here as MAZ3) can selectively capture low concentration $CO_2$ from $N_2$ and $O_2$ containing gas streams. The MAZ3 zeolite shows higher $CO_2$ uptake than 13× in the low $CO_2$ concentration range, although the former contains less aluminum than 13×. Using DAC as a showcase, the disclosure demonstrates that MAZ zeolites exhibit higher capacity, higher selectivity, faster kinetics than the well-studied 13× zeolite.

Compositions

In some aspects, the disclosure is directed to metal ion-doped crystalline microporous aluminosilicate compositions comprising: a three-dimensional aluminosilicate framework having Mazzite (or MAZ-type) topology comprising 12-MR channels and 8-MR cages; wherein the crystalline microporous aluminosilicate contains 2.5 to 14 metal ions per unit cell, wherein the ratio of silicon to aluminum within the unit cell is about 2 to about 4; and wherein the metal ion-doped crystalline microporous aluminosilicate composition adsorbs carbon dioxide when exposed to a gaseous mixture comprising $CO_2$.

In some aspects, the $CO_2$ concentration in the gaseous mixture is 1000 to 3000 ppm.

In some aspects, the $CO_2$ concentration in the gaseous mixture is about 400 ppm.

In some aspects, the gaseous mixture comprising $CO_2$ further comprises oxygen.

In some aspects, the gaseous mixture comprising $CO_2$ further comprises nitrogen.

In some aspects, the gaseous mixture comprising $CO_2$ further comprises air.

In some aspects, the gaseous mixture comprising $CO_2$ further comprises oxygen and air.

As used herein, "air" refers to a gaseous mixture which comprises carbon dioxide, and nitrogen. In some embodiments, "air" further comprises oxygen, i.e., air comprises carbon dioxide, oxygen, and nitrogen. In some embodiments, air refers to atmospheric air. In other embodiments, air refers to the gaseous effluent from a process.

In some aspects, the metal ion-doped crystalline microporous aluminosilicate compositions of the disclosure have a Si:Al atomic ratio in a range of from 2:1 to 13:1, such as, for example, one of 2:1, 2.1:1, 2.2:1, 2.3:1, 2.4:1, 2.5:1, 2.6:1, 2.7:1, 2.8:1, 2.9:1, 3:1, 3.1:1, 3.2:1, 3.3:1, 3.4:1, 3.5:1, 3.6:1, 3.7:1, 3.8:1, 3.9:1, 4:1, 4.1:1, 4.2:1, 4.3:1, 4.4:1, 4.5:1, 4.6:1, 4.7:1, 4.8:1, 4.9:1, 5:1, 5.1:1, 5.2:1, 5.3:1, 5.4:1, 5.5:1, 5.6:1, 5.7:1, 5.8:1, 5.9:1, 6:1, 6.1:1, 6.2:1, 6.3:1, 6.4:1, 6.5:1, 6.6:1, 6.7:1, 6.8:1, 6.9:1, 7:1, 7.1:1, 7.2:1, 7.3:1, 7.4:1, 7.5:1, 7.6:1, 7.7:1, 7.8:1, 7.9:1, 8:1, 8.1:1, 8.2:1, 8.3:1, 8.4:1, 8.5:1, 8.6:1, 8.7:1, 8.8:1, 8.9:1, 9:1, 9.1:1, 9.2:1, 9.3:1, 9.4:1, 9.5:1, 9.6:1, 9.7:1, 9.8:1, 9.9:1, 10:1, 10.1:1, 10.2:1, 10.3:1, 10.4:1, 10.5:1, 10.6:1, 10.7:1, 10.8:1, 10.9:1, 11:1, 11.1:1, 11.2:1, 11.3:1, 11.4:1, 11.5:1, 11.6:1, 11.7:1, 11.8:1, 11.9:1, 12:1, 12.1:1, 12.2:1, 12.3:1, 12.4:1, 12.5:1, 12.6:1, 12.7:1, 12.8:1, 12.9:1, or 13:1.

In some embodiments, the metal ion-doped crystalline microporous aluminosilicate compositions of the disclosure have a Si:Al atomic ratio in a range of from 2:1 to 6:1, such as, for example, one of 2:1, 2.1:1, 2.2:1, 2.3:1, 2.4:1, 2.5:1, 2.6:1, 2.7:1, 2.8:1, 2.9:1, 3:1, 3.1:1, 3.2:1, 3.3:1, 3.4:1, 3.5:1, 3.6:1, 3.7:1, 3.8:1, 3.9:1, 4:1, 4.1:1, 4.2:1, 4.3:1, 4.4:1, 4.5:1, 4.6:1, 4.7:1, 4.8:1, 4.9:1, 5:1, 5.1:1, 5.2:1, 5.3:1, 5.4:1, 5.5:1, 5.6:1, 5.7:1, 5.8:1, 5.9:1, or 6:1.

In other embodiments, the metal ion-doped crystalline microporous aluminosilicate compositions of the disclosure have a Si:Al atomic ratio in a range of from 2:1 to 4:1, such as, for example, one of 2:1, 2.1:1, 2.2:1, 2.3:1, 2.4:1, 2.5:1, 2.6:1, 2.7:1, 2.8:1, 2.9:1, 3:1, 3.1:1, 3.2:1, 3.3:1, 3.4:1, 3.5:1, 3.6:1, 3.7:1, 3.8:1, 3.9:1, or 4:1.

In some aspects, the metal ion-doped crystalline microporous aluminosilicate compositions of the disclosure have a Si:Al atomic ratio in a range of about 3.

In some aspects, the metal ion-doped crystalline microporous aluminosilicate compositions of the disclosure have a Si:Al atomic ratio in a range of about 3.15.

In some aspects, the metal ion-doped crystalline microporous aluminosilicate compositions of the disclosure contain metal ions. In this aspect, the metal ion-doped crystalline microporous aluminosilicate compositions of the disclosure contain 2.5 to 14 metal ions per unit cell, such as, for example, 2.5, 2.6, 2.7, 2.8, 2.9, 3, 3.1, 3.2, 3.3, 3.4, 3.5, 3.6, 3.7, 3.8, 3.9, 4:1, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.1, 12.2, 12.3, 12.4, 12.5, 12.6, 12.7, 12.8, 12.9, 13, 13.1, 13.2, 13.3, 13.4, 13.5, 13.6, 13.7, 13.8, 13.9, or 14 metal ions per unit cell.

In some embodiments, the metal ion-doped crystalline microporous aluminosilicate compositions of the disclosure contain 6 to 9 metal ions per unit cell, such as, for example, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, or 9 metal ions per unit cell.

In some embodiments, the metal ion-doped crystalline microporous aluminosilicate compositions of the disclosure contain 6 to 7 metal ions per unit cell, such as, for example, 6, 6.1, 6.2, 6.3, 6.4, 6.5, 6.6, 6.7, 6.8, 6.9, or 7 metal ions per unit cell.

In some embodiments, the metal ion-doped crystalline microporous aluminosilicate compositions of the disclosure contain 6.77 metal ions per unit cell.

In some embodiments, the metal ion-doped crystalline microporous aluminosilicate compositions of the disclosure contain 3 to 4.5 metal ions per unit cell, such as, for example, 3, 3.1, 3.2, 3.3, 3.4, 3.5, 3.6, 3.7, 3.8, 3.9, 4:1, 4.1, 4.2, 4.3, 4.4, or 4.5 metal ions per unit cell.

In some aspects, the ratio of metal ions to aluminum within the unit cell is from 0.3 to 1.4, such as, for example, one of 0.3, 0.4, 0.5, 0.6, 0.7, 0.8, 0.9, 1, 1.1, 1.2, 1.3, or 1.4.

In some embodiments, the metal ions are positioned within the voids or channels of the three-dimensional aluminosilicate framework.

In some embodiments, the metal ion-doped crystalline microporous aluminosilicate compositions of the disclosure contain 2.5 to 5 metal ions, such as for example, 2.5, 2.6, 2.7, 2.8, 2.9, 3, 3.1, 3.2, 3.3, 3.4, 3.5, 3.6, 3.7, 3.8, 3.9, 4:1, 4.1, 4.2, 4.3, 4.4, 4.5, 4.6, 4.7, 4.8, 4.9, or 5 metal ions, in the 8-MR side-pocket per unit cell.

In some embodiments, the metal ion-doped crystalline microporous aluminosilicate compositions of the disclosure contain 1.2 to 2.5 metal ions, such as, for example, 1.2, 1.3, 1.4, 1.5, 1.6, 1.7, 1.8, 1.9, 2, 2.1, 2.2, 2.3, 2.4, or 2.5 metal ions, in the 8-MR side-pocket per unit cell.

In some embodiments, the metal ions are alkali metal cations.

In some embodiments, the alkali metal cations are $Li^+$, $Na^+$, $K^+$, $Rb^+$, or $Cs^+$.

In some embodiments, the alkali metal cations are $Li^+$.
In some embodiments, the alkali metal cations are $Na^+$.
In some embodiments, the alkali metal cations are $K^+$.
In some embodiments, the alkali metal cations are $Rb^+$.
In some embodiments, the alkali metal cations are $Cs^+$.

In other embodiments, the metal ions are alkaline earth metal cations.

In some embodiments, the alkali earth metal cations are $Mg^{2+}$, $Ca^{2+}$, $Sr^{2+}$, or $Ba^{2+}$.

In some embodiments, the alkali earth metal cations are $Mg^{2+}$.

In some embodiments, the alkali earth metal cations are $Ca^{2+}$.

In some embodiments, the alkali earth metal cations are $Sr^{2+}$.

In some embodiments, the alkali earth metal cations are $Ba^{2+}$.

In some embodiments, the metal ions are transition metal ions.

In some embodiments, the metal ions are Zn, Cu, Ni, or Fe ions.

In some embodiments, the metal ions are Zn ions.
In some embodiments, the metal ions are $Zn^{2+}$ ions.
In some embodiments, the metal ions are Cu ions.
In some embodiments, the metal ions are $Cu^{2+}$ ions.
In some embodiments, the metal ions are $Cu^+$ ions.
In some embodiments, the metal ions are Ni ions.
In some embodiments, the metal ions are $Ni^{2+}$ ions.
In some embodiments, the metal ions are $Ni^+$ ions.
In some embodiments, the metal ions are Fe ions.
In some embodiments, the metal ions are $Fe^{2+}$ ions.
In some embodiments, the metal ions are $Fe^{3+}$ ions.

In some aspects, the metal ion-doped crystalline microporous aluminosilicate compositions of the disclosure are characterized by specific performance characteristics. Thus, in some aspects, the metal ion-doped crystalline microporous aluminosilicate compositions of the disclosure are characterized by the carbon dioxide adsorption capacity. In some aspects, the carbon dioxide adsorption capacity is measured in mmol of carbon dioxide per gram of metal ion-doped crystalline microporous aluminosilicate composition under specified conditions of pressure and temperature. Methods for measuring the mmol of carbon dioxide adsorbed per gram of composition under specified conditions of pressure and temperature are known by those of skill in the art, and include those methods set forth herein. The capacity is often measured by volumetric based approaches, e.g., isotherms or fixed-bed column breakthrough experiments, or by gravimetric based methods using instruments with microbalance, e.g., thermogravimetric analysis.

In some embodiments, the metal ion-doped crystalline microporous aluminosilicate compositions of the disclosure adsorb at least 0.1 mmol; or at least 0.2 mmol; or at least 0.3 mmol; or at least 0.4 mmol; or at least 0.5 mmol; or at least 0.6 mmol; or at least 0.65 mmol; or at least 0.7 mmol; or at least 0.8 mmol; or at least 0.9 mmol; or at least 1 mmol; or at least 1.1 mmol; or at least 1.2 mmol; or at least 1.3 mmol; or at least 1.4 mmol of carbon dioxide per gram of metal ion-doped crystalline microporous aluminosilicate composition when exposed to $CO_2$ at a pressure of 0.0004 bar and a temperature of 30° C.

In other aspects, the carbon dioxide adsorption capacity is measured in molecules of adsorbed carbon dioxide per unit cell of metal ion-doped crystalline microporous aluminosilicate composition under specified conditions of pressure and temperature. Methods for measuring the number of molecules of carbon dioxide adsorbed per unit cell of composition under specified conditions of pressure and temperature are known by those of skill in the art, and include those methods set forth herein. The number of carbon dioxide molecules adsorbed per unit cell was calculated using the molar weight of unit cell based on compositions measured by elemental analysis, e.g., EDX, and the carbon dioxide capacity measured by volumetric or gravimetric methods.

In some embodiments, the metal ion-doped crystalline microporous aluminosilicate compositions of the disclosure adsorb from 0.3 to 4 molecules, such as, for example, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, or 4, molecules of $CO_2$ per unit cell when exposed to $CO_2$ at a pressure of 0.0004 bar and a temperature of 30° C.

In some embodiments, the metal ion-doped crystalline microporous aluminosilicate compositions of the disclosure adsorb from 0.3 to 3.5 molecules, such as, for example, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, or 3.5, molecules of $CO_2$ per unit cell when exposed to $CO_2$ at a pressure of 0.0004 bar and a temperature of 30° C.

In other embodiments, the metal ion-doped crystalline microporous aluminosilicate compositions of the disclosure adsorb from 0.3 to 2.4 molecules, such as, for example, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, or 2.4, molecules of $CO_2$ per unit cell when exposed to $CO_2$ at a pressure of 0.0004 bar and a temperature of 30° C.

In some embodiments, the metal ion-doped crystalline microporous aluminosilicate compositions of the disclosure adsorb from 0.5 to 2 molecules, such as, for example, 0.5, 0.6, 0.7, 0.8, 0.9, 1, 1.1, 1.2, 1.3, 1.4, 1.5, 1.6, 1.7, 1.8, 1.9, or 2, molecules of $CO_2$ per unit cell when exposed to $CO_2$ at a pressure of 0.0004 bar and a temperature of 30° C.

In some embodiments, the metal ion-doped crystalline microporous aluminosilicate compositions of the disclosure adsorb from 1 to 2 molecules, such as, for example, 1, 1.1, 1.2, 1.3, 1.4, 1.5, 1.6, 1.7, 1.8, 1.9, or 2, molecules of $CO_2$ per unit cell when exposed to $CO_2$ at a pressure of 0.0004 bar and a temperature of 30° C.

In some embodiments, the metal ion-doped crystalline microporous aluminosilicate compositions of the disclosure adsorb about 1.5 molecules of $CO_2$ per unit cell when exposed to $CO_2$ at a pressure of 0.0004 bar and a temperature of 30° C.

In some aspects, the metal ion-doped crystalline microporous aluminosilicate compositions are those wherein passage of a gaseous mixture having (a) a total pressure in a range of from 50 kPa to 350 kPa, and (b) a $CO_2$ content in a range of from 350 to 1000 ppm, through a tube containing a fixed bed of the metal ion-doped crystalline microporous aluminosilicate composition results in complete breakthrough of $CO_2$ after adsorption of an amount of $CO_2$ (on a mmol/g basis) that is 1.5-2 times greater than the amount of $CO_2$ adsorbed by an equal weight of zeolite 13× before complete saturation of $CO_2$ occurs under the same conditions.

In some aspects, the metal ion-doped crystalline microporous aluminosilicate compositions are those wherein passage of a gaseous mixture having (a) a total pressure in a range of from 50 kPa to 350 kPa, and (b) a $CO_2$ content in a range of from 350 to 1000 ppm, through a tube containing powders of the metal ion-doped crystalline microporous aluminosilicate composition results in equilibrium of $CO_2$ after adsorption of an amount of $CO_2$ (on a mmol/g basis) that is 1.5-2 times greater than the amount of $CO_2$ adsorbed by an equal weight of zeolite 13× before complete equilibrium of $CO_2$ occurs under the same conditions.

In some aspects, the gaseous mixture has a total pressure in a range of from 50 kPa to 350 kPa, such as, for example, 50 kPa, 75 kPa, 100 kPa, 125 kPa, 150 kPa, 175 kPa, 200 kPa, 225 kPa, 250 kPa, 275 kPa, 300 kPa, 325 kPa, or 350 kPa.

In other aspects, the gaseous mixture has a $CO_2$ content in a range of from 350 to 1000 ppm, such as, for example, 350 ppm, 375 ppm, 400 ppm, 425 ppm, 450 ppm, 475 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, or 1000 ppm.

In some aspects, passage of the gaseous mixture through the fixed bed of the metal ion-doped crystalline microporous aluminosilicate composition results in complete breakthrough of $CO_2$ after adsorption of an amount of $CO_2$ (on a mmol/g basis) that is 1.5-2, such as, for example, 1.5 times, 1.6 times, 1.7 times, 1.8 time, 1.9 times, or 2, times greater than the amount of $CO_2$ adsorbed by an equal weight of zeolite 13× before complete saturation of $CO_2$ occurs under the same conditions. As used herein, "complete breakthrough" means that the amount or concentration of $CO_2$ exiting the fixed bed of the metal ion-doped crystalline microporous aluminosilicate composition is the same as the amount or concentration of $CO_2$ entering the fixed bed. Methods for measuring "complete breakthrough" are known by those of skill in the art, and include those methods set forth herein.

In some embodiments, the gaseous mixture is 400 ppm $CO_2$/400 ppm Ar/He at a fixed flow rate at 30° C.

In some embodiments, the gaseous mixture is 400 ppm $CO_2$/400 ppm Ar/He at a flow rate of 10-30 mL·min$^{-1}$ at 30° C.

In some embodiments, the gaseous mixture is 400 ppm $CO_2$/400 ppm Ar/He at a flow rate of 20 mL·min$^{-1}$ at 30° C.

In some embodiments, the gaseous mixture is 400 ppm $CO_2$/400 ppm Ar/20% He/balance $N_2$ at a fixed flow rate at 30° C.

In some embodiments, the gaseous mixture is 400 ppm $CO_2$/400 ppm Ar/20% He/balance $N_2$ at a flow rate of 10-30 mL·min$^{-1}$ at 30° C.

In other embodiments, the gaseous mixture is 400 ppm $CO_2$/400 ppm Ar/20% He/balance $N_2$ at a flow rate of 20 mL·min$^{-1}$ at 30° C.

In yet other embodiments, the gaseous mixture is 400 ppm $CO_2$/400 ppm Ar/20% $O_2$/balance $N_2$, at a flow rate of 20 mL·min$^{-1}$ at 30° C.

In some aspects, the metal ion-doped crystalline microporous aluminosilicate compositions of the disclosure which have adsorbed carbon dioxide, have the adsorbed carbon dioxide desorbed at a temperature of less than 150° C. In such embodiments, the carbon dioxide may be desorbed by heating the metal ion-doped crystalline microporous aluminosilicate compositions while passing a stream of inert gas through the composition.

In other embodiments of the metal ion-doped crystalline microporous aluminosilicate compositions of the disclosure, the adsorbed carbon dioxide is desorbed at a temperature of less than 125° C.

In other embodiments of the metal ion-doped crystalline microporous aluminosilicate compositions of the disclosure, the adsorbed carbon dioxide is desorbed at a temperature of less than 100° C.

In other embodiments of the metal ion-doped crystalline microporous aluminosilicate compositions of the disclosure, the adsorbed carbon dioxide is desorbed at a temperature of less than 75° C.

In other embodiments of the metal ion-doped crystalline microporous aluminosilicate compositions of the disclosure, the adsorbed carbon dioxide is desorbed at a temperature of less than 60° C.

In other embodiments of the metal ion-doped crystalline microporous aluminosilicate compositions of the disclosure, the adsorbed carbon dioxide is desorbed at a temperature of less than 50° C.

In some aspects, the metal ion-doped crystalline microporous aluminosilicate compositions of the disclosure are those wherein the metal ion-doped crystalline microporous aluminosilicate composition has a selectivity for $CO_2$ over $N_2$. As used herein, "selectivity" means that the metal ion-doped crystalline microporous aluminosilicate composition adsorbs one species of molecule in preference to another species of molecule. Selectivity is expressed as a ratio of one molecule to another molecule against the ratio of the molar fraction of one molecule to another molecule. The $CO_2/N_2$ selectivity is defined as $$\text{Selectivity} = \frac{q_1/q_2}{p_1/p_2},$$

where $q_i$ and $p_i$ denote the capacity and partial pressure, respectively, of component i.

In some embodiments, the metal ion-doped crystalline microporous aluminosilicate composition of the disclosure have a selectivity for $CO_2$ over $N_2$ of at least 2000:1.

In some embodiments, the metal ion-doped crystalline microporous aluminosilicate compositions of the disclosure have a selectivity for $CO_2$ over $N_2$ of at least 4000:1.

In other embodiments, the metal ion-doped crystalline microporous aluminosilicate compositions of the disclosure have a selectivity for $CO_2$ over $N_2$ of at least 3000:1.

Methods of Use

In some aspects, the disclosure is directed to methods of capturing carbon dioxide from a gaseous source mixture that comprises carbon dioxide, wherein the methods comprise contacting the gaseous source mixture with the metal ion-doped crystalline microporous aluminosilicate as described in the disclosure such that carbon dioxide in the gaseous source mixture is adsorbed by the metal ion-doped crystalline microporous aluminosilicate.

In some embodiments, the gaseous mixture further comprises oxygen.

In other embodiments, the gaseous mixture further comprises nitrogen.

In other embodiments, the gaseous mixture further comprises air.

In other embodiments, the gaseous mixture is humid (i.e., further comprises water).

In some aspects, the methods of the disclosure further comprise desorbing the adsorbed carbon dioxide from the carbon-dioxide laden metal ion-doped crystalline microporous aluminosilicate.

In some embodiments of the methods of the disclosure, the contacting of the metal ion-doped crystalline microporous aluminosilicate compositions with the gaseous source mixture is done in the absence of, or without the use of, an added desiccant.

In other embodiments of the methods of the disclosure, the contacting of the metal ion-doped crystalline microporous aluminosilicate with the gaseous source mixture is done in the presence of, or with the use of, an added desiccant.

In some embodiments of the methods of the disclosure, contacting the gaseous source mixture with the metal ion-doped crystalline microporous aluminosilicate comprises passing the gaseous source mixture through a fixed-bed of adsorbent comprising the metal ion-doped crystalline microporous aluminosilicate.

In some embodiments of the methods of the disclosure, contacting the gaseous source mixture with the metal ion-doped crystalline microporous aluminosilicate occurs at a temperature of less than 60° C.

In some embodiments of the methods of the disclosure, contacting the gaseous source mixture with the metal ion-doped crystalline microporous aluminosilicate occurs at a temperature of less than 50° C.

In some embodiments of the methods of the disclosure, contacting the gaseous source mixture with the metal ion-doped crystalline microporous aluminosilicate occurs at a temperature of less than 40° C.

In some embodiments of the methods of the disclosure, contacting the gaseous source mixture with the metal ion-doped crystalline microporous aluminosilicate occurs at a temperature of less than 30° C.

In some embodiments of the methods of the disclosure, contacting the gaseous source mixture with the metal ion-doped crystalline microporous aluminosilicate occurs at a temperature of less than 20° C.

In other embodiments of the methods of the disclosure, contacting the gaseous source mixture with the metal ion-doped crystalline microporous aluminosilicate occurs at a temperature of less than 10° C.

In some embodiments of the methods of the disclosure, contacting the gaseous source mixture with the metal ion-doped crystalline microporous aluminosilicate occurs at a temperature of less than 0° C.

In other embodiments of the methods of the disclosure, contacting the gaseous source mixture with the metal ion-doped crystalline microporous aluminosilicate occurs at a temperature of less than −10° C.

In some embodiments of the methods of the disclosure, desorbing the carbon dioxide from the carbon-dioxide laden metal ion-doped crystalline microporous aluminosilicate occurs at a temperature less than 150° C.

In other embodiments of the methods of the disclosure, desorbing the carbon dioxide from the carbon-dioxide laden metal ion-doped crystalline microporous aluminosilicate occurs at a temperature less than 125° C.

In other embodiments of the methods of the disclosure, desorbing the carbon dioxide from the carbon-dioxide laden metal ion-doped crystalline microporous aluminosilicate occurs at a temperature less than 100° C.

In other embodiments of the methods of the disclosure, desorbing the carbon dioxide from the carbon-dioxide laden metal ion-doped crystalline microporous aluminosilicate occurs at a temperature less than 75° C.

In other embodiments of the methods of the disclosure, desorbing the carbon dioxide from the carbon-dioxide laden metal ion-doped crystalline microporous aluminosilicate occurs at a temperature less than 60° C.

In some aspects of the methods of the disclosure, the gaseous source mixture has (a) a total pressure in a range of from 50 kPa to 350 kPa, and (b) a $CO_2$ content in a range of from 350 to 1000 ppm.

In some embodiments of the disclosed methods, the gaseous source mixture has a total pressure in a range of from 50 kPa to 350 kPa, such as, for example, 50 kPa, 75 kPa, 100 kPa, 125 kPa, 150 kPa, 175 kPa, 200 kPa, 225 kPa, 250 kPa, 275 kPa, 300 kPa, 325 kPa, or 350 kPa.

In some embodiments of the disclosed methods, the gaseous source mixture has a total pressure in a range of from 50 kPa to 300 kPa.

In some embodiments of the disclosed methods, the gaseous source mixture has a total pressure in a range of from 50 kPa to 250 kPa.

In some embodiments of the disclosed methods, the gaseous source mixture has a total pressure in a range of from 50 kPa to 200 kPa.

In some embodiments of the disclosed methods, the gaseous source mixture has a total pressure in a range of from 50 kPa to 150 kPa.

In some embodiments of the disclosed methods, the gaseous source mixture has a total pressure in a range of from 50 kPa to 125 kPa.

In some embodiments of the disclosed methods, the gaseous source mixture has a total pressure in a range of from 50 kPa to 100 kPa.

In some aspects of the methods of the disclosure, the gaseous source mixture has a $CO_2$ content in a range of from 350 to 1000 ppm, such as, for example, 350 ppm, 375 ppm, 400 ppm, 425 ppm, 450 ppm, 475 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, or 1000 ppm.

In some embodiments of the disclosed methods, the gaseous source mixture has a $CO_2$ content in a range of from 350 to 750 ppm.

In some embodiments of the disclosed methods, the gaseous source mixture has a $CO_2$ content in a range of from 350 to 600 ppm.

In some embodiments of the disclosed methods, the gaseous source mixture has a $CO_2$ content in a range of from 350 to 500 ppm.

In some embodiments of the disclosed methods, the gaseous source mixture has a $CO_2$ content in a range of from 350 to 425 ppm.

In some embodiments of the methods of the disclosure, the gaseous source mixture is humid, i.e., contains water vapor.

In some embodiments, the gaseous source mixture contains 30,000 ppm or less of water, such as, for example, 30,000 ppm or less, 20,000 ppm or less, 17,500 ppm or less, 15,000 ppm or less, 12,500 ppm or less, 10,000 ppm or less, 7500 ppm or less, 5000 ppm or less, or 2500 ppm or less.

In some embodiments, the gaseous source mixture contains 2500 ppm or less water.

In some embodiments of the methods of the disclosure, the humid gaseous source mixture passes through a desiccant before passing through the metal ion-doped crystalline microporous aluminosilicate. Without intending to be bound by theory, it is believed that the desiccant removes water from the gaseous source mixture. Water in the gaseous source mixture can reduce the $CO_2$ adsorption capacity of the metal ion-doped crystalline microporous aluminosilicate; thus, by removing the water in the gaseous source mixture, the $CO_2$ adsorption capacity of the metal ion-doped crystalline microporous aluminosilicate is maximized. Moreover, the temperature required to desorb water from the metal ion-doped crystalline microporous aluminosilicates of the disclosure is significantly higher than the temperature required to desorb $CO_2$ from the metal ion-doped crystalline microporous aluminosilicate.

In some embodiments, the desiccant is selected by matching the temperature at which water is desorbed from the desiccant to the temperature at which $CO_2$ is desorbed from the metal ion-doped crystalline microporous aluminosilicate. Selecting the desiccant in this manner allows regeneration of both the desiccant and the metal ion-doped crystalline microporous aluminosilicate simultaneously, and at the same temperature.

In some embodiments, the desiccant desorbs water at a temperature of 150° C. or less, such as, for example, 150° C. or less, 140° C. or less, 130° C. or less, 120° C. or less, 110° C. or less, 100° C. or less, 90° C. or less, or 80° C. or less.

In some embodiments, the desiccant desorbs water at a temperature of 120° C. or less.

In some embodiments, the desiccant desorbs water at a temperature of 110° C. or less.

In some embodiments, the desiccant desorbs water at a temperature of 100° C. or less.

In some aspects, the disclosure is directed to methods of capturing carbon dioxide from a humid gaseous source mixture that comprises water and carbon dioxide, wherein the methods comprise contacting the gaseous source mixture first with a desiccant, then with the metal ion-doped crystalline microporous aluminosilicate as described in the disclosure, such that water in the gaseous source mixture is adsorbed by the desiccant and carbon dioxide in the gaseous source mixture is adsorbed by the metal ion-doped crystalline microporous aluminosilicate.

In some embodiments, the desiccant is SAPO-34.

In other embodiments, the desiccant is ALPO-34.

In some embodiments, the humid gaseous source mixture is contacted with the desiccant at a temperature of 120° C. or less, 110° C. or less, 100° C. or less, 90° C. or less, or 80° C. or less, 70° C. or less, 60° C. or less, 50° C. or less, 40° C. or less, 30° C. or less, 20° C. or less, 10° C. or less, 0° C. or less, –10° C. or less, or –20° C. or less.

In some embodiments, the humid gaseous source mixture is contacted with the desiccant at a temperature of 30° C. or less.

In other embodiments, the humid gaseous source mixture is contacted with the desiccant at a temperature of 10° C. or less.

In other embodiments, the humid gaseous source mixture is contacted with the desiccant at a temperature of 0° C. or less.

In other embodiments, the humid gaseous source mixture is contacted with the desiccant at a temperature of –10° C. or less.

In some embodiments, after the humid gaseous source mixture is contacted with the desiccant, it is contacted with the metal ion-doped crystalline microporous aluminosilicate at a temperature of 120° C. or less, 110° C. or less, 100° C. or less, 90° C. or less, or 80° C. or less, 70° C. or less, 60° C. or less, 50° C. or less, 40° C. or less, 30° C. or less, 20° C. or less, 10° C. or less, 0° C. or less, –10° C. or less, or –20° C. or less.

In some embodiments, after the humid gaseous source mixture is contacted with the desiccant, it is contacted with the metal ion-doped crystalline microporous aluminosilicate at a temperature of 30° C. or less.

In some embodiments, after the humid gaseous source mixture is contacted with the desiccant, it is contacted with the metal ion-doped crystalline microporous aluminosilicate at a temperature of 10° C. or less.

In some embodiments, after the humid gaseous source mixture is contacted with the desiccant, it is contacted with the metal ion-doped crystalline microporous aluminosilicate at a temperature of 0° C. or less.

In some embodiments, after the humid gaseous source mixture is contacted with the desiccant, it is contacted with the metal ion-doped crystalline microporous aluminosilicate at a temperature of –10° C. or less.

In some embodiments, the desiccant and the metal ion-doped crystalline microporous aluminosilicate are arranged in sequential layers in a single vessel (such as, for example, a column). In these embodiments, the humid gaseous source mixture passes first through the desiccant layer and then through the metal ion-doped crystalline microporous aluminosilicate layer.

In other embodiments, the desiccant and the metal ion-doped crystalline microporous aluminosilicate are contained in separate vessels. In these embodiments, the humid gaseous source mixture passes first through the desiccant in a first vessel, and then through the metal ion-doped crystalline microporous aluminosilicate in a second vessel.

In some embodiments, regeneration of the desiccant and the metal ion-doped crystalline microporous aluminosilicate is accomplished by passing a regeneration gas first through the metal ion-doped crystalline microporous aluminosilicate and then through to desiccant.

In some embodiments, the methods of capturing carbon dioxide from a humid gaseous source mixture using a desiccant and metal ion-doped crystalline microporous aluminosilicate further comprise regenerating the desiccant and the metal ion-doped crystalline microporous aluminosilicate by passing a gas through the metal ion-doped crystalline microporous aluminosilicate and through the desiccant at a temperature of 150° C. or less, such as, for example, 150° C. or less, 140° C. or less, 130° C. or less, 120° C. or less, 110° C. or less, 100° C. or less, 90° C. or less, or 80° C. or less.

In some embodiments, regenerating the desiccant and metal ion-doped crystalline microporous aluminosilicate by passing a gas through the metal ion-doped crystalline microporous aluminosilicate and through the desiccant is conducted at a temperature of 110° C. or less, 100° C. or less, 90° C. or less, or 80° C. or less.

In some embodiments, regenerating the metal ion-doped crystalline microporous aluminosilicate and the desiccant by passing a gas through the desiccant and metal ion-doped crystalline microporous aluminosilicate is conducted at a temperature of 100° C. or less.

In some embodiments, the metal ion-doped crystalline microporous aluminosilicate is regenerated by passing a gas through the metal ion-doped crystalline microporous aluminosilicate and through the desiccant at a temperature of 150° C. or less, such as, for example, 150° C. or less, 140° C. or less, 130° C. or less, 120° C. or less, 110° C. or less, 100° C. or less, 90° C. or less, or 80° C. or less.

In some embodiments, the metal ion-doped crystalline microporous aluminosilicate is regenerated by passing a gas through the metal ion-doped crystalline microporous aluminosilicate at a temperature of 110° C. or less, 100° C. or less, 90° C. or less, or 80° C. or less.

In some embodiments, the metal ion-doped crystalline microporous aluminosilicate is regenerated by passing a gas through the metal ion-doped crystalline microporous aluminosilicate at a temperature of 100° C. or less.

In some embodiments, the desiccant is regenerated by passing a gas through the desiccant at a temperature of 150° C. or less, such as, for example, 150° C. or less, 140° C. or less, 130° C. or less, 120° C. or less, 110° C. or less, 100° C. or less, 90° C. or less, or 80° C. or less.

In some embodiments, the desiccant is regenerated by passing a gas through the desiccant at a temperature of 110° C. or less, 100° C. or less, 90° C. or less, or 80° C. or less.

In some embodiments, the desiccant is regenerated by passing a gas through the desiccant at a temperature of 100° C. or less.

In some embodiments, regeneration of the desiccant and the metal ion-doped crystalline microporous aluminosilicate, water desorbed from the desiccant during regeneration is not passed through the metal ion-doped crystalline microporous aluminosilicate.

In some embodiments, the regeneration gas is an inert gas such as, nitrogen, argon, helium, or mixtures thereof. In other embodiments, the regeneration gas is air.

In embodiments in which the desiccant and the metal ion-doped crystalline microporous aluminosilicate are contained in separate vessels, water may be collected for beneficial use from the regeneration gas after regenerating the desiccant.

In some aspects, the disclosure is directed to a multi-unit system comprising two or more parallel adsorption units, wherein each unit comprises a bed of desiccant and a bed of a metal ion-doped crystalline microporous aluminosilicate. In these aspects, humid gaseous source mixture is passed through a first adsorption unit, passing first through the desiccant bed and then through the metal ion-doped crystalline microporous aluminosilicate bed. The effluent from that first adsorption unit is then passed through a second, parallel adsorption unit in the opposite orientation (i.e., the effluent from the first adsorption unit is passed first through the metal ion-doped crystalline microporous aluminosilicate bed of the second unit and then through the desiccant bed of the second adsorption unit.

In some embodiments, the adsorption and desorption processes are conducted at the same temperature.

In other embodiments, the adsorption and desorption processes are conducted at the different temperatures.

In some embodiments, the adsorption process is conducted at about 30° C. or less.

In some embodiments, the desorption process is conducted at about 150° C. or less.

In some embodiments, the desorption process is conducted at about 100° C.

EXAMPLES

Synthesis of Materials

Omega-1 (MAZ). Omega-1 zeolites were synthesized following A. J. Perrotta, C. Kibby, B. R. Mitchell, E. R. Tucci, The synthesis, characterization, and catalytic activity of omega and ZSM-4 zeolites. *J. Catal.* 55, 240-249 (1978). The OSDA (TMAOH, Sigma-Aldrich) was first mixed with water. Then sodium hydroxide and sodium aluminate were added. To the solution silica (Ludox-40, Sigma-Aldrich) was added and stirred for 30 min. The molar composition of the resulting solution was: 10 $SiO_2$:1.0 $Al_2O_3$:1.6 TMAOH: 3.2 $Na_2O$:160 $H_2O$. The solution was charged into a polypropylene bottle and heated to 95° C. for 10 days. The material is designated as MAZ3(CIT). MAZ zeolites from Tosoh Inc. (designated as MAZ3) and 13× zeolites from Sigma Aldrich were used as references.

Calcination of zeolites. After the synthesis was completed, the resulting solids were washed three times with distilled water. The materials synthesized with OSDAs were further washed by acetone. To remove the OSDAs from zeolites, the obtained solids were then dried at 80° C. before calcining in a flow air furnace at 580° C. for 8 h, with a ramp rate of 1.0° C./min. Crystallinity of the materials was examined using lab-based X-ray diffraction (XRD).

Aqueous-phase Ion-Exchange of Zeolites. Cation containing zeolites were prepared by ion exchange of calcined or as received zeolites with 1M aqueous solutions with corresponding cations. Typically, 600 mg of zeolites were added to 30 mL of salt solutions, which were then stirred at 80° C. for 24 h. The exchanged crystals were dried at 100° C. in ambient air in a free convention oven overnight. The materials were recovered by centrifugation and washed 6 times with copious amount of distilled water. The exchanged crystals were dried at 100° C. overnight. The cation density was measured using energy-dispersive X-ray spectroscopy (EDS).

Characterizations

X-ray diffraction. The crystallinity of the materials was examined using powder X-ray diffraction (XRD). The XRD patterns were collected using a Rigaku Miniflex II desktop instrument with a Cu radiation source, $K\alpha$=1.5418 A.

Scanning electron microscopy. The morphology of the materials was measured using scanning electron microscopy (SEM, ZEISS 1550 VP FESEM). The SEM was equipped with an Oxford X-Max SDD. Energy dispersive X-ray spectroscopy (EDS) used for determining the element contents of each sample.

Adsorption performance testing. The adsorption performance of zeolites for $CO_2$ was tested using both single component static adsorption and dynamic column breakthrough methods. For the single component experiments, UHP-grade (99.999% purity) carbon dioxide was used for all adsorption measurements. $CO_2$ isotherms were measured on a Quantachrome Autosorb iQ adsorption. For each measurement, ca. 100 mg adsorbent was placed in a sample holder that was immersed into a liquid bath connected to a recirculating chiller with a precise temperature controller. Prior to adsorption measurements, all samples were outgassed at 60° C. for 0.5 h, followed by holds of 0.5 h at 120° C. and 6 h at 350° C. with all the ramp rates of 1.0° C./min. The zeolite performance for $CO_2$ adsorption was also tested using fixed bed column breakthrough experiments. Typically, ca. 500 mg of materials were placed in a quartz tubing (6.74 mm I.D.) to form a fixed bed. First, the adsorbent bed was purged under a 20 mL/min$^{-1}$ flow of 5% Ar/He gas at 550° C. for 24 h before a breakthrough experiment to completely remove the water and $CO_2$.

Upon cooling to 30° C., the gas flow was switched to the desired gas mixture (ca. 400 ppm $CO_2$/400 ppm Ar (internal standard)/He or 400 ppm $CO_2$/1Ar % (internal standard)/ 20% $O_2/N_2$) at a flow rate of 20 mL/min. The outlet composition was continuously monitored using a Ametek Dymaxion Dycor mass spectrometer until a complete breakthrough was achieved. After each breakthrough experiment, the packed column bed was regenerated at 550° C. for 2 h, or 100° C. or 60° C. for 240 min with a constant 5% Ar/He flow (20 mL/min) to test the recyclability of the materials. The $CO_2/N_2$ selectivity is defined as $$\text{Selectivity} = \frac{q_1/q_2}{p_1/p_2},$$

where qi and pi denote the capacity and partial pressure of component i.

Results

Figure 2:
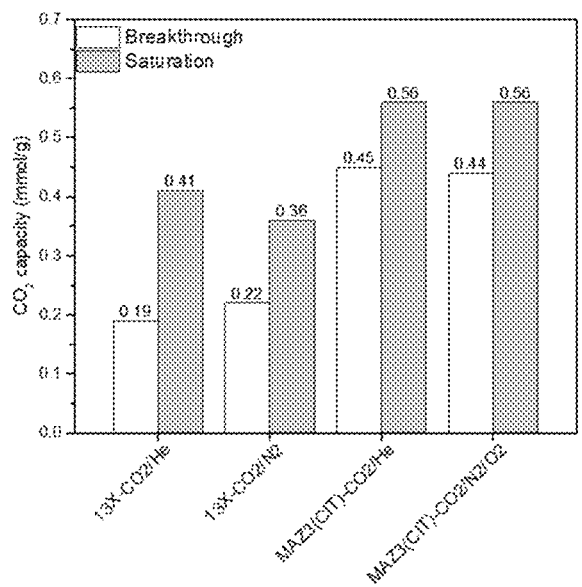
FIG. 2 shows the adsorption capacities of $CO_2$ for MAZ3 (CIT) and 13X zeolites with simulated air gas streams at 30° C. $CO_2$/He indicates 400 ppm$CO_2$/400 ppm Ar (internal standard)/He), $CO_2$/$N_2$ indicates 400 ppm$CO_2$/1% Ar (internal standard)/20% He/$N_2$), and $CO_2$/$N_2$/$O_2$ indicates 400 ppm$CO_2$/1% Ar (internal standard)/20% $O_2$/$N_2$).
Figure 3:
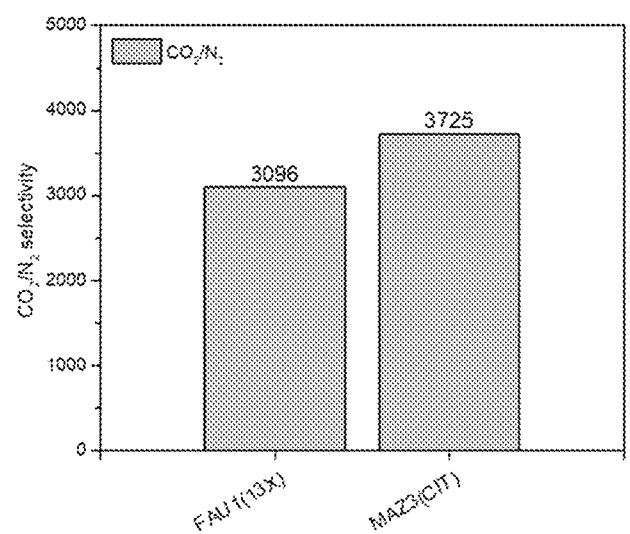
FIG. 3 shows the $CO_2$/$N_2$ selectivity of MAZ3(CIT) and 13× zeolites obtained with simulated air at 30° C. Adsorption experiments were performed with 400 ppm$CO_2$/1% Ar (internal standard)/20% He/$N_2$ for 13× and 400 ppm$CO_2$/1% Ar (internal standard)/20% $O_2$/$N_2$ for MAZ3(CIT).
Figure 4:
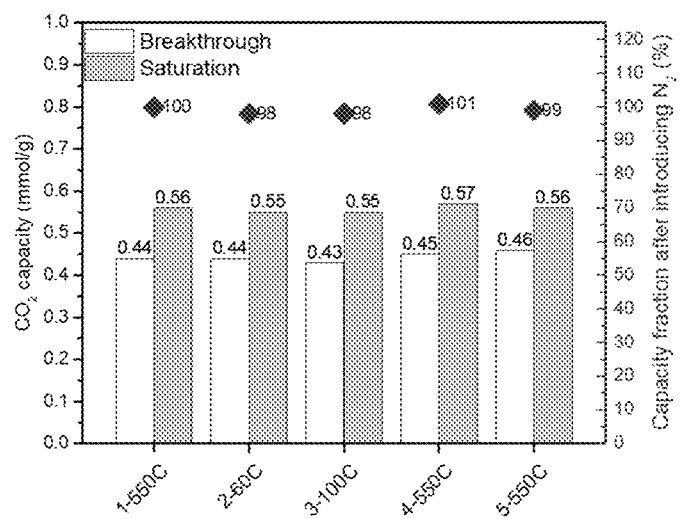
FIG. 4 shows multicycle breakthrough results of MAZ3 (CIT) for the adsorption of $CO_2$ from a gas mixture of 400 ppm$CO_2$/1% Ar (internal standard)/20% $O_2$/$N_2$ at 30° C. 1-550 C denotes the result obtained after regeneration at 550° C. for the first adsorption-desorption cycle.

FIG. 1 shows findings of the $CO_2$ uptake capacity for the adsorption of low concentration $CO_2$. FIGS. 2-4 summarize the results of Mazzite (MAZ) zeolites for the adsorption of $CO_2$ from a simulated air stream with nitrogen and oxygen included. 13× zeolite was used as a reference material for all cases as it is the mostly well-studied and top-performing zeolite for the adsorption of low concentration $CO_2$.

FIGS. 5-14 show that adsorption of carbon dioxide from low concentration carbon dioxide content sources with MAZ Zeolites.

Figure 5:
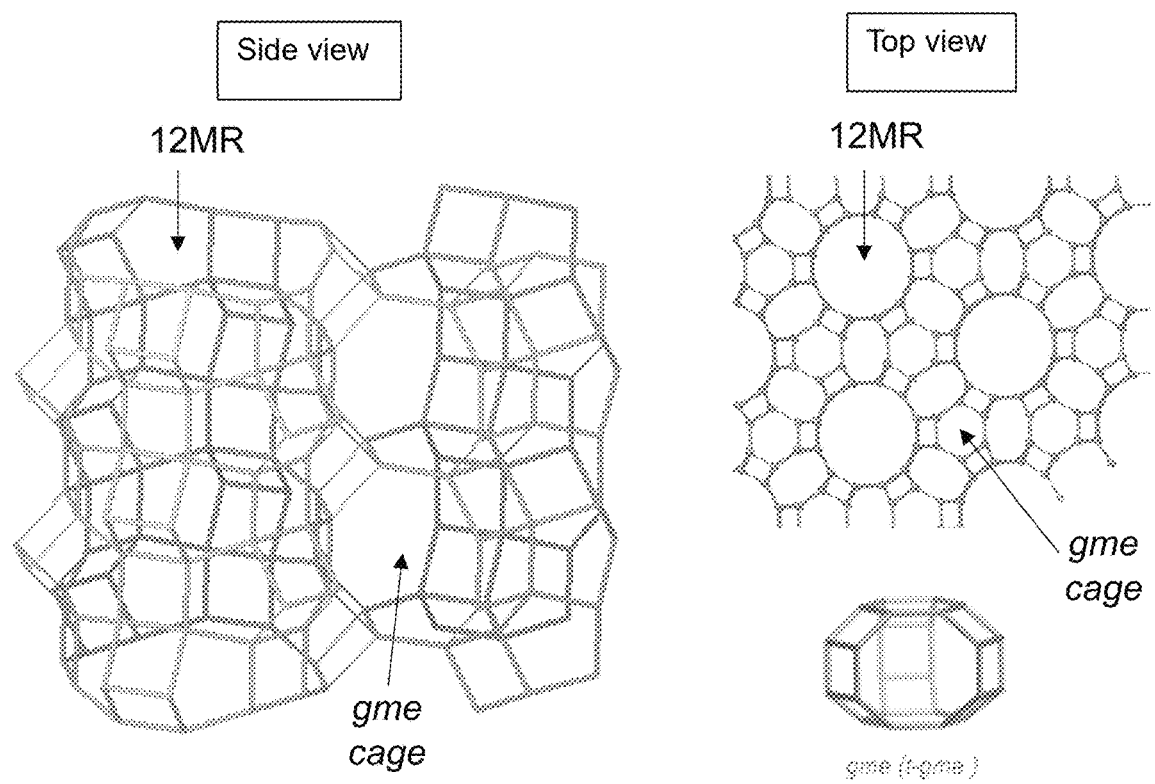
FIG. 5 shows framework of Mazzite (MAZ) zeolites. Sample nomenclature: MAZ3(CIT):MAZ zeolite with Si/Al=ca. 3 synthesized at Caltech; MAZ3:MAZ3 zeolite from Tosoh Inc. MAZ3 zeolites used as reference through this invention.
Figure 6:
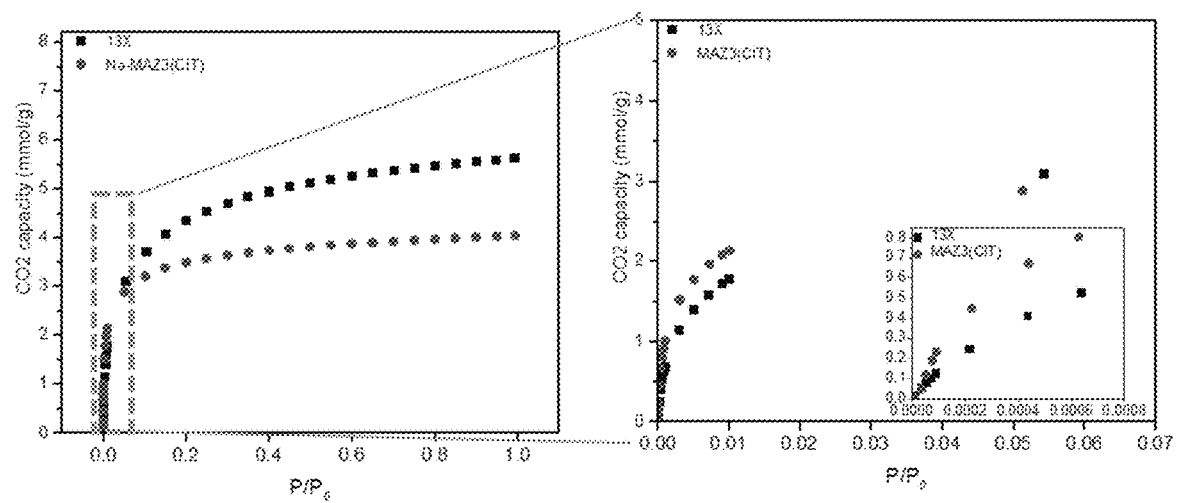
FIG. 6 shows comparison of the $CO_2$ uptake of MAZ3 (CIT) and 13×. MAZ3(CIT) zeolite shows higher $CO_2$ uptake than 13× in the low $CO_2$ concentration range (right panel), while it exhibits much lower uptake than 13× in the high concentration range (left panel).
Figure 7:
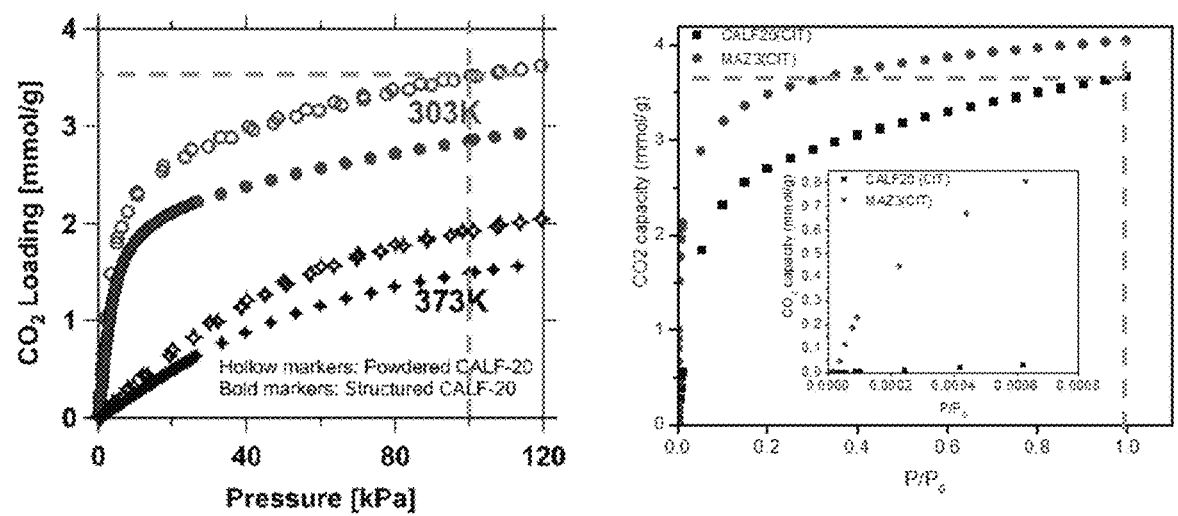
FIG. 7 shows comparison of the $CO_2$ uptake of the state-of-the-art MOF (CALF20) material and MAZ3. The left panel is figure S5 from Science 374, 1464 (2021). The right panel is results from materials synthesized at Caltech (CIT). Isotherm for CALF20 was measured at 303K to have the same condition from the paper; isotherm for MAZ3(CIT) was measured at 298K. The CALF20(CIT) shows similar $CO_2$ isotherm to that from the paper, indicating the successful synthesis of the MOF material. The CALF20(CIT) shows similar $CO_2$ isotherm to that from the paper, indicating the successful synthesis of the MOF material.
Figure 8:
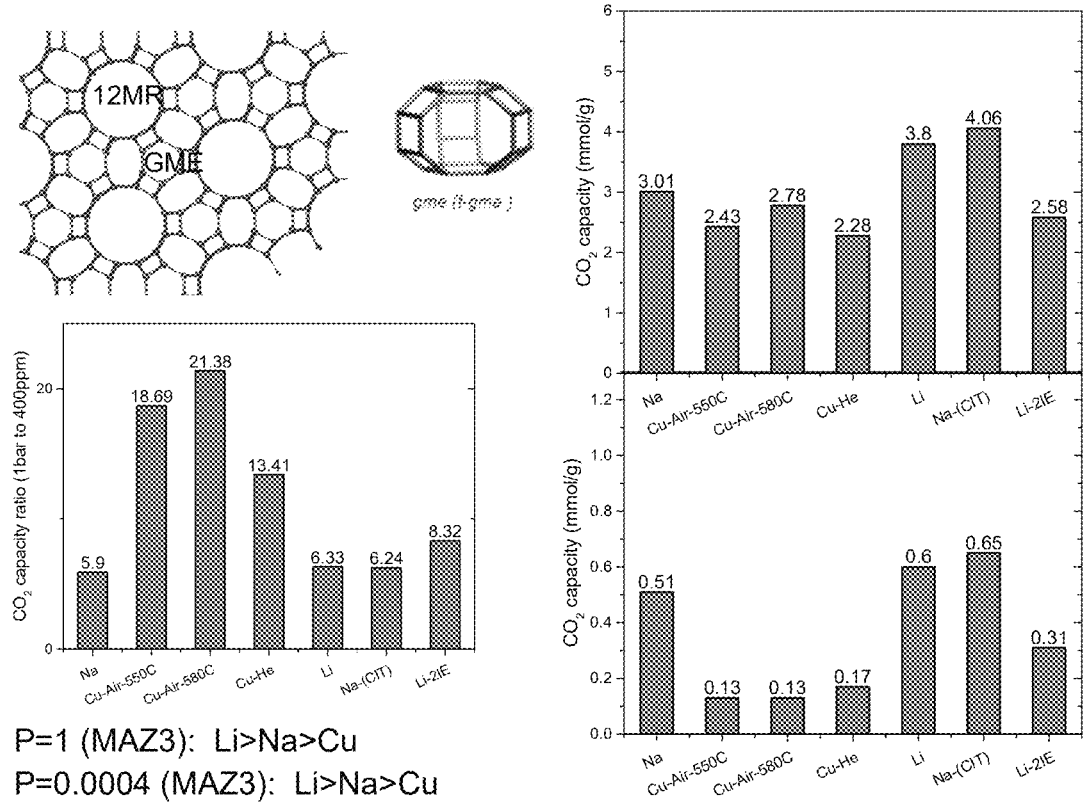
FIG. 8 shows $CO_2$ uptake of MAZ zeolites. $CO_2$ uptake for MAZ zeolites can be tuned by introducing extra framework cations. MAZ3 denotes MAZ zeolites from Tosoh Inc, and MAZ3(CIT) denotes MAZ zeolites synthesized at CIT.
Figure 9:
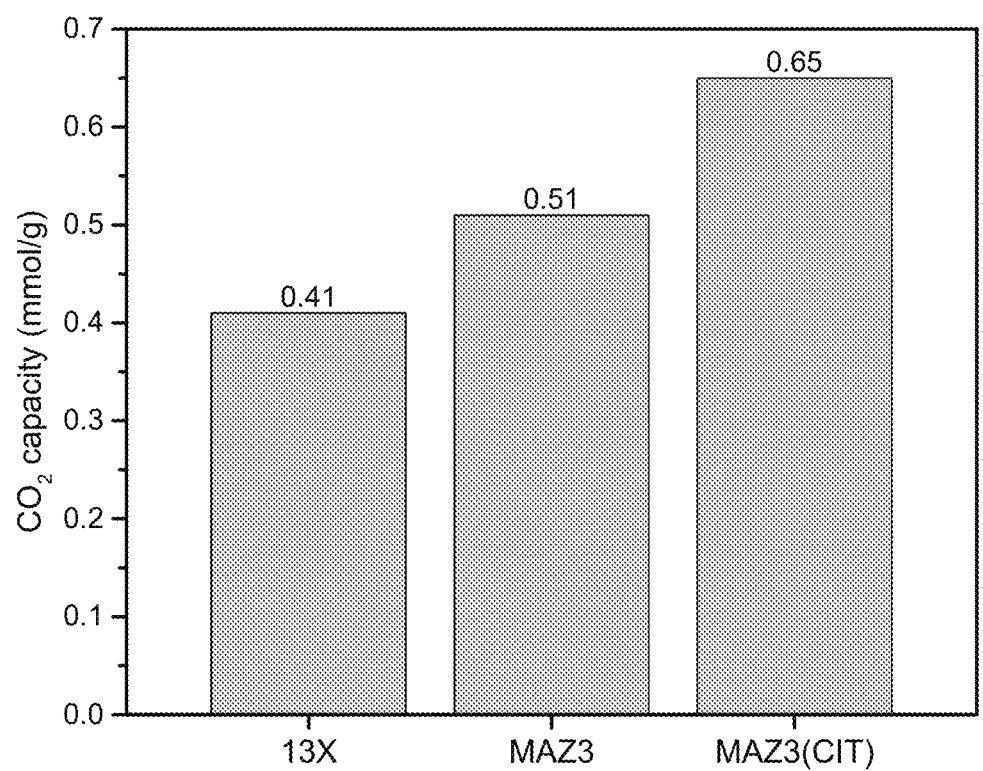
FIG. 9 shows comparison of the $CO_2$ uptake of 13× and MAZ from isotherms at 0.0004 P/P0. The 0.65 mmol/g capacity from isotherm of MAZ3(CIT) is higher than the 0.56 mmol/g capacity from breakthrough experiments of MAZ3(CIT) with $CO_2$/He, which could be because the materials for the two experiments are from different batches. The highest $CO_2$ uptake for MAZ3 zeolites obtained is 0.65 mmol/g at 0.0004 P/P0, that corresponds to the 400 ppm $CO_2$ in the air. MAZ3 denotes MAZ zeolites from Tosoh Inc, and MAZ3(CIT) denotes MAZ zeolites synthesized at CIT.
Figure 10:
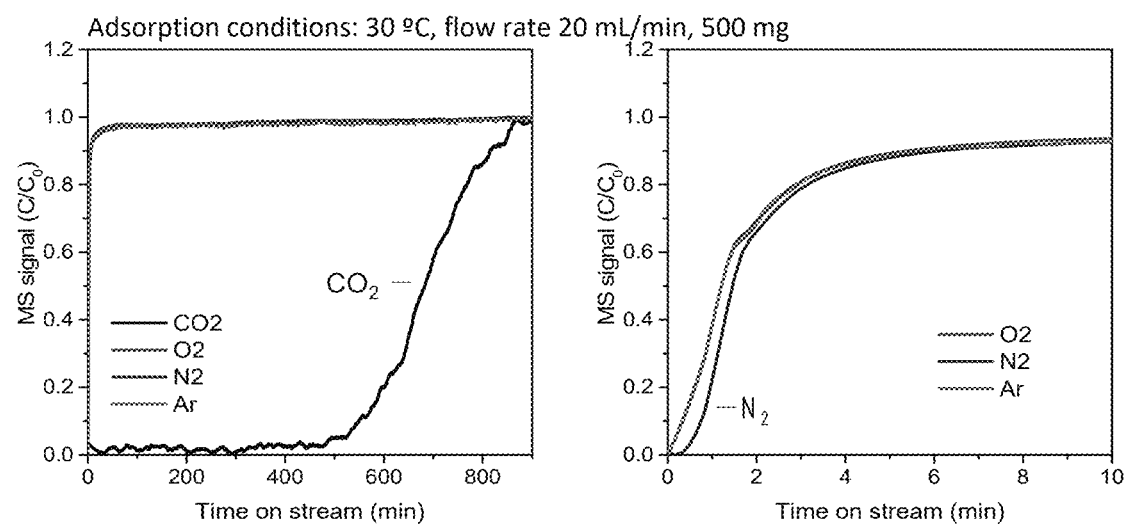
FIG. 10 shows $CO_2$ and $N_2$ breakthrough profiles for MAZ3(CIT) with $CO_2/N_2/O_2$. The MAZ zeolite adsorbs 0.56 mmol $CO_2$/g zeolite (left panel). The MAZ3 zeolite adsorbs 0.31 mmol $N_2$/g zeolite, which corresponds to a $CO_2/N_2$ selectivity of 3725. The MAZ zeolite does not adsorb or adsorbs trace amount of $O_2$, as the breakthrough profile overlaps with that from Ar.
Figure 11:
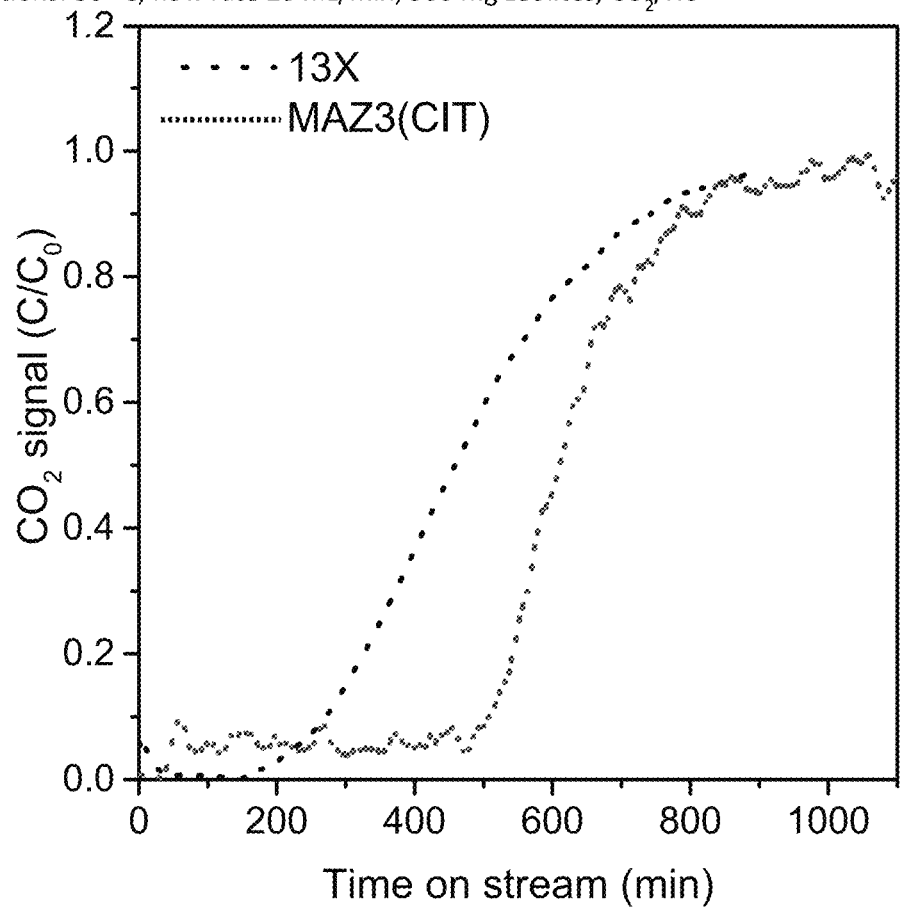
FIG. 11 shows comparison of the $CO_2$ breakthrough profiles of 13× and MAZ3(CIT). The MAZ zeolite shows faster adsorption kinetics than 13×, as shown by the sharper breakthrough profiles for MAZ3(CIT). The MAZ zeolite shows higher adsorption capacity than 13×, as illustrated by the longer breakthrough and saturation time for MAZ3 (CIT).
Figure 12:
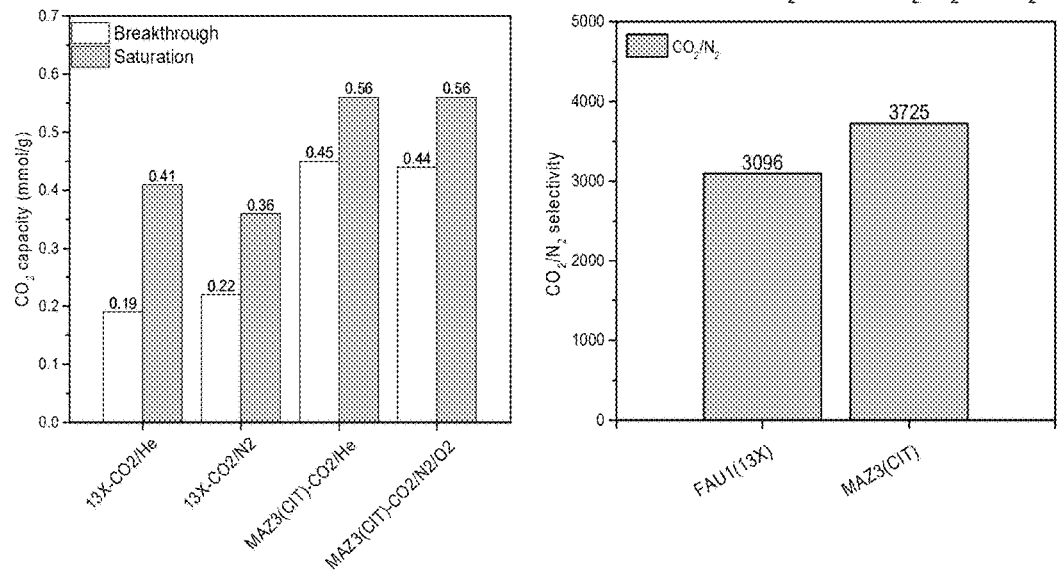
FIG. 12 shows comparison of the $CO_2$ capacity and selectivity of 13X and MAZ3(CIT) for direct air capture. No apparent capacity loss was shown in MAZ3(CIT) with $N_2$ introduced into the gas stream, while the capacity of 13× decreased by 12% under the same conditions (Left panel); The MAZ3 shows faster kinetics than 13× with both $CO_2$/He and $CO_2/N_2$ gas streams, as shown by the smaller difference between breakthrough and saturation capacities for MAZ (Left panel); The MAZ shows 1.6 times saturation capacity of 13× (Left panel); The $CO_2/N_2$ selectivity for the MAZ zeolite is higher than that of 13× (Right panel).
Figure 13:
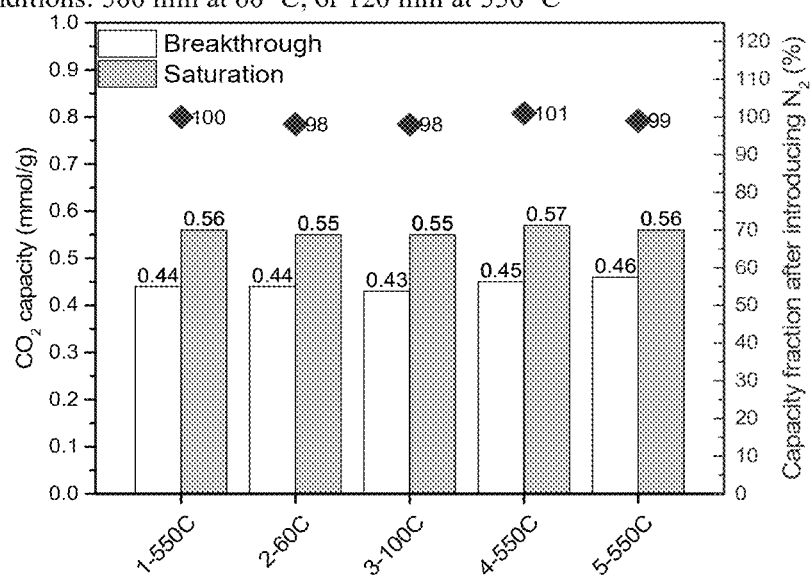
FIG. 13 shows results from multicycle breakthrough experiments of MAZ3(CIT). The MAZ zeolite is stable under gas streams with $O_2$ after 5 adsorption-desorption cycles at temperatures up to 550° C. The MAZ zeolite can be fully regenerated at temperatures as low as 60° C.
Figure 14:
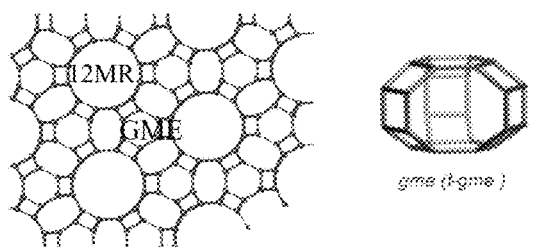
FIG. 14 shows that the MAZ zeolite can be fully regenerated at temperatures as low as 60° C. MAZ3 denotes MAZ zeolites from Tosoh Inc, and MAZ3 (CIT) denotes MAZ zeolites synthesized at CIT.
Figure 14:
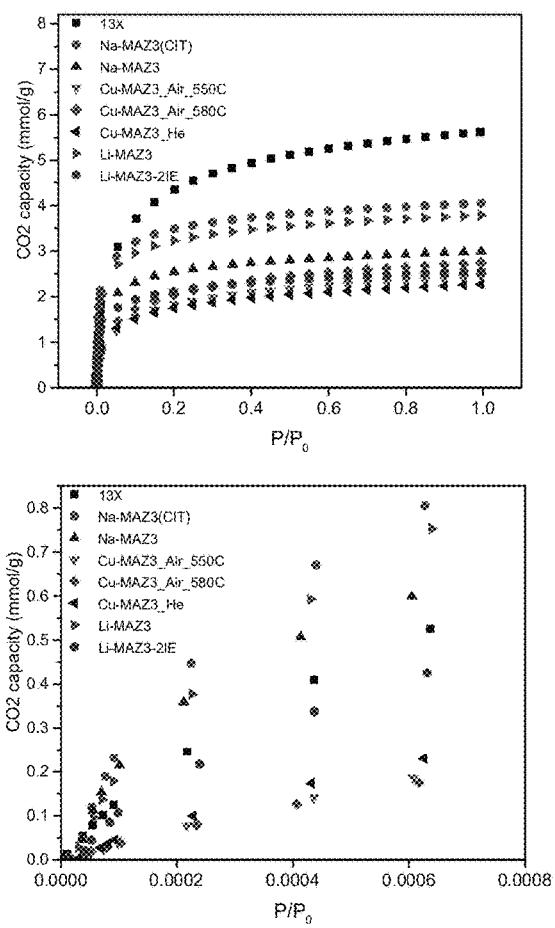

FIG. 5 shows framework of MAZ zeolites. FIGS. 6 and 7 show adsorption performance of MAZ zeolites in the low $CO_2$ concentration range. FIGS. 8-13 show adsorption performance of MAZ zeolites for direct air capture with 400 ppm $CO_2$ with adsorption conditions at 30° C. with a flow rate of 20 mL/min and 500 mg zeolites. $CO_2$/He indicates 400 ppm$CO_2$/400 ppm Ar (internal standard)/He; $CO_2/N_2$ indicates 400 ppm$CO_2$/1% Ar (internal standard)/20% He/$N_2$; $CO_2/N_2/O_2$ indicates 400 ppm$CO_2$/1% Ar (internal standard)/20% $O_2/N_2$.

FIGS. 5-14 demonstrate that the MAZ zeolite with Si/Al=ca. 3 exhibits higher $CO_2$ uptake than 13× zeolite in the low $CO_2$ concentration range, and that introducing $N_2$ and $O_2$ does not impact the $CO_2$ uptake. With a particular focus on DAC, the MAZ3 zeolite shows high capacity, high $CO_2/N_2$ selectivity and fast kinetics for DAC. The material is also highly stable with the presence of $O_2$ after five adsorption-desorption cycles. Generally, MAZ zeolites are utilized as catalysts for processes such as hydroisomerization of alkanes, methane partial oxidation to methanol, alkylation of aromatics, etc. To the best of our knowledge, this is the first report of using MAZ zeolites for the adsorption of low concentration $CO_2$, although pure $CO_2$ adsorption has been reported with MAZ zeolites modified with polyoldendrimers (I. Terrab, et al., *Thermochim. Acta.* 2016, 624, 95-101) or cations (A. Hakiki, et al., *Thermochim. Acta.* 2018, 662, 108-115). FIGS. 5-13 also demonstrate that materials exhibit better performance for high concentration $CO_2$ are not necessarily good candidates for the adsorption of low concentration $CO_2$. The characteristic features of atmospheric air are: 1) 400 (outdoor) to 3000 ppm (enclosed spaces) $CO_2$ with 80% $N_2$; 2) high concentration (e.g., 20% for air) $O_2$, which leads to time-dependent degradation of other type of materials, such as amines; 3) competitive adsorption between $H_2O$ and $CO_2$, and thus more hydrophobic adsorbents are required.

In summary, the results demonstrate that MAZ zeolite shows much higher $CO_2$ uptake than 13× zeolites (the top-performing zeolites) and CALF20 (the state-of-the-art MOF material scaled up for flue gas capture) in the low $CO_2$ concentration range. MAZ exhibits higher $CO_2$ capacity, higher $CO_2/N_2$ selectivity, faster diffusion kinetics, compared to 13× when adsorb low concentration $CO_2$ from $N_2$ containing gas streams. The capacity of MAZ is not affected by $N_2$ and $O_2$. MAZ can be fully regenerated at 60° C. from adsorptions with $CO_2/N_2/O_2$ gas streams. The highest $CO_2$ uptake obtained with MAZ3 is 0.65 mmol/g for adsorption $CO_2$ at 0.0004P/P0 that is relevant to direct air capture conditions.

The relationship between the size of the zeolite pores space and the adsorption behavior for capturing low concentration $CO_2$ was investigated. MAZ zeolite has a Si/Al ratio of 3.15 (by energy dispersive x-ray spectroscopy (EDS)), a Na/Al ratio of 0.78 (by EDS), and a micropore volume of 0.05 cm$^3$/g. MAZ zeolite also has a $CO_2$ adsorption capacity of 0.65 mmol/g at 400 ppm $CO_2$, an adsorption efficiency of 0.22 $CO_2$/Na$^+$ at 400 ppm $CO_2$, and a $CO_2$ adsorption capacity of 4.06 mmol/g at 1 bar $CO_2$.

The MAZ zeolites with a Si/Al of 3 showed a high adsorption capacity of 0.65 mmol/g for 400 ppm $CO_2$. Results from $CO_2$ adsorption with pyridine containing MAZ zeolite shows that the 8-MR side-pocket of the MAZ framework is responsible for the adsorption of 400 ppm $CO_2$.

The disclosure is also directed to the following Aspects:

Aspect 1. A metal ion-doped crystalline microporous aluminosilicate composition comprising: a three-dimensional aluminosilicate framework having Mazzite topology comprising 12-MR channels and 8-MR cages; wherein the crystalline microporous aluminosilicate contains 2.5 to 14 metal ions per unit cell, wherein the ratio of silicon to aluminum within the unit cell is about 2 to about 4; and wherein the metal ion-doped crystalline microporous aluminosilicate composition adsorbs carbon dioxide when exposed to a gaseous mixture comprising $CO_2$.

Aspect 2. The metal ion-doped crystalline microporous aluminosilicate composition of aspect 1, wherein $CO_2$ concentration is 1000 to 3000 ppm.

Aspect 3. The metal ion-doped crystalline microporous aluminosilicate composition of aspect 1, wherein $CO_2$ concentration is about 400 ppm.

Aspect 4. The metal ion-doped crystalline microporous aluminosilicate composition of aspect 1, wherein the gaseous mixture further comprises oxygen.

Aspect 5. The metal ion-doped crystalline microporous aluminosilicate composition of aspect 1, wherein the gaseous mixture further comprises nitrogen.

Aspect 6. The metal ion-doped crystalline microporous aluminosilicate composition of aspect 1, wherein the gaseous mixture further comprises air.

Aspect 7. The metal ion-doped crystalline microporous aluminosilicate composition of any one of the preceding aspects, wherein the composition has a Si:Al atomic ratio in a range of about 3.

Aspect 8. The metal ion-doped crystalline microporous aluminosilicate composition of any one of the preceding aspects, wherein the metal ions are positioned within the voids or channels of the three-dimensional aluminosilicate framework.

Aspect 9. The composition according to any one of aspects 1 to 8, wherein the metal ions are alkali metal cations.

Aspect 10. The composition according to aspect 9, wherein the alkali metal cations are $Li^+$, $Na^+$, $K^+$, $Rb^+$, or $Cs^+$.

Aspect 11. The composition according to aspect 10, wherein the metal ions are $Li^+$.

Aspect 12. The composition according to aspect 10, wherein the metal ions are $Na^+$.

Aspect 13. The composition according to aspect 10, wherein the metal ions are $K^+$.

Aspect 14. The composition according to aspect 10, wherein the metal ions are $Rb^+$.

Aspect 15. The composition according to aspect 10, wherein the metal ions are $Cs^+$.

Aspect 16. The metal ion-doped crystalline microporous aluminosilicate composition of any one of aspects 1-15, wherein the crystalline microporous aluminosilicate contains 6 to 7 metal ions per unit cell.

Aspect 17. The metal ion-doped crystalline microporous aluminosilicate composition of any one of aspects 1-16, wherein the crystalline microporous aluminosilicate contains 6.77 metal ions per unit cell.

Aspect 18. The composition according to any one of aspects 1 to 8, wherein the metal ions are alkaline earth metal cations.

Aspect 19. The composition according to aspect 18, wherein the alkali earth metal cations are $Mg^{2+}$, $Ca^{2+}$, $Sr^{2+}$, or $Ba^{2+}$.

Aspect 20. The composition according to aspect 19, wherein the metal ions are $Mg^{2+}$.

Aspect 21. The composition according to aspect 19, wherein the metal ions are $Ca^{2+}$.

Aspect 22. The composition according to aspect 19, wherein the metal ions are $Sr^{2+}$.

Aspect 23. The composition according to aspect 19, wherein the metal ions are $Ba^{2+}$.

Aspect 24. The composition according to any one of aspects 1 to 8, wherein the metal ions are transition metal ions.

Aspect 25. The composition according to any one of aspects 1 to 8, wherein the metal ions are Zn, Cu, Ni, or Fe ions.

Aspect 26. The composition according to aspect 25, wherein the metal ions are Zn ions.

Aspect 27. The composition according to aspect 25, wherein the metal ions are Cu ions.

Aspect 28. The composition according to aspect 25, wherein the metal ions are Ni ions.

Aspect 29. The composition according to aspect 25, wherein the metal ions are Fe ions.

Aspect 30. The metal ion-doped crystalline microporous aluminosilicate composition of any one of the preceding aspects, wherein the metal ion-doped crystalline microporous aluminosilicate composition adsorbs at least 0.1 mmol of carbon dioxide per gram of metal ion-doped crystalline microporous aluminosilicate composition when exposed to $CO_2$ at a pressure of 0.0004 bar and a temperature of 30° C.

Aspect 31. The metal ion-doped crystalline microporous aluminosilicate composition of any one of the preceding aspects, wherein the metal ion-doped crystalline microporous aluminosilicate composition adsorbs at least 0.2 mmol of carbon dioxide per gram of metal ion-doped crystalline microporous aluminosilicate composition when exposed to $CO_2$ at a pressure of 0.0004 bar and a temperature of 30° C.

Aspect 32. The metal ion-doped crystalline microporous aluminosilicate composition of any one of the preceding aspects, wherein the metal ion-doped crystalline microporous aluminosilicate composition adsorbs at least 0.3 mmol of carbon dioxide per gram of metal ion-doped crystalline microporous aluminosilicate composition when exposed to $CO_2$ at a pressure of 0.0004 bar and a temperature of 30° C.

Aspect 33. The metal ion-doped crystalline microporous aluminosilicate composition of any one of the preceding aspects, wherein the metal ion-doped crystalline microporous aluminosilicate composition adsorbs at least 0.4 mmol of carbon dioxide per gram of metal ion-doped crystalline microporous aluminosilicate composition when exposed to $CO_2$ at a pressure of 0.0004 bar and a temperature of 30° C.

Aspect 34. The metal ion-doped crystalline microporous aluminosilicate composition of any one of the preceding aspects, wherein the metal ion-doped crystalline microporous aluminosilicate composition adsorbs at least 0.5 mmol of carbon dioxide per gram of metal ion-doped crystalline microporous aluminosilicate composition when exposed to $CO_2$ at a pressure of 0.0004 bar and a temperature of 30° C.

Aspect 35. The metal ion-doped crystalline microporous aluminosilicate composition of any one of the preceding aspects, wherein the metal ion-doped crystalline microporous aluminosilicate composition adsorbs at least 0.6 mmol of carbon dioxide per gram of metal ion-doped crystalline microporous aluminosilicate composition when exposed to $CO_2$ at a pressure of 0.0004 bar and a temperature of 30° C.

Aspect 36. The metal ion-doped crystalline microporous aluminosilicate composition of any one of the preceding aspects, wherein the metal ion-doped crystalline microporous aluminosilicate composition adsorbs at least 0.7 mmol of carbon dioxide per gram of metal ion-doped crystalline microporous aluminosilicate composition when exposed to $CO_2$ at a pressure of 0.0004 bar and a temperature of 30° C.

Aspect 37. The metal ion-doped crystalline microporous aluminosilicate composition of any one of the preceding aspects, wherein the metal ion-doped crystalline microporous aluminosilicate composition adsorbs at least 0.8 mmol of carbon dioxide per gram of metal ion-doped crystalline microporous aluminosilicate composition when exposed to $CO_2$ at a pressure of 0.0004 bar and a temperature of 30° C.

Aspect 38. The metal ion-doped crystalline microporous aluminosilicate composition of any one of the preceding aspects, wherein the metal ion-doped crystalline microporous aluminosilicate composition adsorbs at least 0.9 mmol of carbon dioxide per gram of metal ion-doped crystalline microporous aluminosilicate composition when exposed to $CO_2$ at a pressure of 0.0004 bar and a temperature of 30° C.

Aspect 39. The metal ion-doped crystalline microporous aluminosilicate composition of any one of the preceding aspects, wherein the metal ion-doped crystalline microporous aluminosilicate composition adsorbs at least 1 mmol of carbon dioxide per gram of metal ion-doped crystalline microporous aluminosilicate composition when exposed to $CO_2$ at a pressure of 0.0004 bar and a temperature of 30° C.

Aspect 40. The metal ion-doped crystalline microporous aluminosilicate composition of any one of the preceding aspects, wherein the metal ion-doped crystalline microporous aluminosilicate composition adsorbs at least 1.1 mmol of carbon dioxide per gram of metal ion-doped crystalline microporous aluminosilicate composition when exposed to $CO_2$ at a pressure of 0.0004 bar and a temperature of 30° C.

Aspect 41. The metal ion-doped crystalline microporous aluminosilicate composition of any one of the preceding aspects, wherein the metal ion-doped crystalline microporous aluminosilicate composition adsorbs at least 1.2 mmol of carbon dioxide per gram of metal ion-doped crystalline microporous aluminosilicate composition when exposed to $CO_2$ at a pressure of 0.0004 bar and a temperature of 30° C.

Aspect 42. The metal ion-doped crystalline microporous aluminosilicate composition of any one of the preceding aspects, wherein the metal ion-doped crystalline microporous aluminosilicate composition adsorbs at least 1.3 mmol of carbon dioxide per gram of metal ion-doped crystalline microporous aluminosilicate composition when exposed to $CO_2$ at a pressure of 0.0004 bar and a temperature of 30° C.

Aspect 43. The metal ion-doped crystalline microporous aluminosilicate composition of any one of the preceding aspects, wherein the metal ion-doped crystalline microporous aluminosilicate composition adsorbs at least 1.4 mmol of carbon dioxide per gram of metal ion-doped crystalline microporous aluminosilicate composition when exposed to $CO_2$ at a pressure of 0.0004 bar and a temperature of 30° C.

Aspect 44. The metal ion-doped crystalline microporous aluminosilicate composition of any one of the preceding aspects, wherein exposure of the crystalline microporous aluminosilicate composition to $CO_2$ at a pressure of 0.0004 bar and a temperature of 30° C. results in adsorption of carbon dioxide in a range of from about 0.3 to 4 molecules adsorbed $CO_2$ per unit cell.

Aspect 45. The metal ion-doped crystalline microporous aluminosilicate composition of any one of the preceding aspects, wherein exposure of the crystalline microporous aluminosilicate composition to $CO_2$ at a pressure of 0.0004 bar and a temperature of 30° C. results in adsorption of carbon dioxide in a range of from about 0.3 to 2.4 molecules adsorbed $CO_2$ per unit cell.

Aspect 46. The metal ion-doped crystalline microporous aluminosilicate composition of any one of the preceding aspects, wherein exposure of the crystalline microporous aluminosilicate composition to $CO_2$ at a pressure of 0.0004 bar and a temperature of 30° C. results in adsorption of carbon dioxide in a range of from about 0.5 to 2 molecules adsorbed $CO_2$ per unit cell.

Aspect 47. The metal ion-doped crystalline microporous aluminosilicate composition of any one of the preceding aspects, wherein exposure of the crystalline microporous aluminosilicate composition to $CO_2$ at a pressure of 0.0004 bar and a temperature of 30° C. results in adsorption of carbon dioxide in a range of from about 1 to 2 molecules adsorbed $CO_2$ per unit cell.

Aspect 48. The metal ion-doped crystalline microporous aluminosilicate composition of any one of the preceding aspects, wherein exposure of the crystalline microporous aluminosilicate composition to $CO_2$ at a pressure of 0.0004 bar and a temperature of 30° C. results in adsorption of carbon dioxide is about 1.5 molecules adsorbed $CO_2$ per unit cell.

Aspect 49. The metal ion-doped crystalline microporous aluminosilicate composition of any one of the preceding aspects, wherein passage of a gaseous mixture having (a) a total pressure in a range of from 50 kPa to 350 kPa, and (b) a $CO_2$ content in a range of from 350 to 1000 ppm, through a tube containing a fixed bed of the metal ion-doped crystalline microporous aluminosilicate composition, results in complete breakthrough of $CO_2$ after adsorption of an amount of $CO_2$ (on a mmol/g basis) that is about 1.5-2 times greater than the amount of $CO_2$ adsorbed by an equal weight of zeolite 13x before complete saturation of $CO_2$ occurs under the same conditions.

Aspect 50. The metal ion-doped crystalline microporous aluminosilicate composition of aspect 49, wherein the gaseous mixture is 400 ppm $CO_2$/400 ppm Ar/He at a fixed flow rate at 30° C.

Aspect 51. The metal ion-doped crystalline microporous aluminosilicate composition of aspect 49, wherein the gaseous mixture is 400 ppm $CO_2$/400 ppm Ar/He at a flow rate of 20 mL·min$^{-1}$ at 30° C.

Aspect 52. The metal ion-doped crystalline microporous aluminosilicate composition of aspect 49, wherein the gaseous mixture is 400 ppm $CO_2$/400 ppm Ar/20% He/balance $N_2$ at a flow rate of 20 mL·min$^{-1}$ at 30° C.

Aspect 53. The metal ion-doped crystalline microporous aluminosilicate composition of aspect 49, wherein the gaseous mixture is 400 ppm $CO_2$/400 ppm Ar/20% $O_2$/balance $N_2$, at a flow rate of 20 mL·min$^{-1}$ at 30° C.

Aspect 54. The metal ion-doped crystalline microporous aluminosilicate composition of any one of the preceding aspects, wherein adsorbed carbon dioxide is desorbed at a temperature of less than 150° C.

Aspect 55. The metal ion-doped crystalline microporous aluminosilicate composition of aspect 54, wherein adsorbed carbon dioxide is desorbed at a temperature of less than 125° C.

Aspect 56. The metal ion-doped crystalline microporous aluminosilicate composition of aspect 55, wherein adsorbed carbon dioxide is desorbed at a temperature of less than 100° C.

Aspect 57. The metal ion-doped crystalline microporous aluminosilicate composition of aspect 56, wherein adsorbed carbon dioxide is desorbed at a temperature of less than 75° C.

Aspect 58. The metal ion-doped crystalline microporous aluminosilicate composition of aspect 57, wherein adsorbed carbon dioxide is desorbed at a temperature of less than 60° C.

Aspect 59. The metal ion-doped crystalline microporous aluminosilicate composition of any one of the preceding aspects, wherein the metal ion-doped crystalline microporous aluminosilicate composition has a selectivity for $CO_2$ over $N_2$ of at least 2000:1.

Aspect 60. The metal ion-doped crystalline microporous aluminosilicate composition of any one of the preceding aspects, wherein the metal ion-doped crystalline microporous aluminosilicate composition has a selectivity for $CO_2$ over $N_2$ of at least 3000:1.

Aspect 61. The metal ion-doped crystalline microporous aluminosilicate composition of any one of the preceding aspects, wherein the metal ion-doped crystalline microporous aluminosilicate composition has a selectivity for $CO_2$ over $N_2$ of at least 4000:1.

Aspect 62. A method of capturing carbon dioxide from a gaseous source mixture that comprises carbon dioxide, the method comprising contacting the gaseous source mixture with the metal ion-doped crystalline microporous aluminosilicate of any one of the preceding aspects such that carbon dioxide in the gaseous source mixture is adsorbed by the metal ion-doped crystalline microporous aluminosilicate.

Aspect 63. The method of aspect 62, wherein the gaseous mixture further comprises oxygen.

Aspect 64. The method of aspect 62 or aspect 63, wherein the gaseous mixture further comprises air.

Aspect 65. The method of any one of aspects 62 to 64, wherein the gaseous mixture is humid (i.e., further comprises water).

Aspect 66. The method of any one of aspects aspect 62-65, further comprising desorbing the adsorbed carbon dioxide from the carbon-dioxide laden metal ion-doped crystalline microporous aluminosilicate.

Aspect 67. The method of any one of aspects 62-66, wherein the contacting of the metal ion-doped crystalline microporous aluminosilicate with the gaseous source mixture is done in the absence of, or without the use of, an added desiccant.

Aspect 68. The method of any one of aspects 62-67, wherein contacting the gaseous source mixture with the metal ion-doped crystalline microporous aluminosilicate comprises passing the gaseous source mixture through a fixed-bed of adsorbent comprising the metal ion-doped crystalline microporous aluminosilicate.

Aspect 69. The method of any one of aspects 62-68, wherein contacting the gaseous source mixture with the metal ion-doped crystalline microporous aluminosilicate occurs at a temperature of less than 60° C.

Aspect 70. The method of any one of aspects 62-69, wherein contacting the gaseous source mixture with the metal ion-doped crystalline microporous aluminosilicate occurs at a temperature of less than 30° C.

Aspect 71. The method of any one of aspects 62-70, wherein contacting the gaseous source mixture with the metal ion-doped crystalline microporous aluminosilicate occurs at a temperature of less than 10° C.

Aspect 72. The method of any one of aspects 62-71, wherein contacting the gaseous source mixture with the metal ion-doped crystalline microporous aluminosilicate occurs at a temperature of less than 0° C.

Aspect 73. The method of any one of aspects 62-72, wherein contacting the gaseous source mixture with the metal ion-doped crystalline microporous aluminosilicate occurs at a temperature of less than −10° C.

Aspect 74. The method of any one of aspects 62-73, wherein desorbing the carbon dioxide from the carbon-dioxide laden metal ion-doped crystalline microporous aluminosilicate occurs at a temperature less than 150° C.

Aspect 75. The method of any one of aspects 62-74, wherein desorbing the carbon dioxide from the carbon-dioxide laden metal ion-doped crystalline microporous aluminosilicate occurs at a temperature less than 125° C.

Aspect 76. The method of any one of aspects 62-75, wherein desorbing the carbon dioxide from the carbon-dioxide laden metal ion-doped crystalline microporous aluminosilicate occurs at a temperature less than 100° C.

Aspect 77. The method of any one of aspects 62-76, wherein desorbing the carbon dioxide from the carbon-dioxide laden metal ion-doped crystalline microporous aluminosilicate occurs at a temperature less than 75° C.

Aspect 78. The method of any one of aspects 62-77, wherein desorbing the carbon dioxide from the carbon-dioxide laden metal ion-doped crystalline microporous aluminosilicate occurs at a temperature less than 60° C.

Aspect 79. The method of any one of aspects 62-78, wherein the gaseous source mixture has (a) a total pressure in a range of from 50 kPa to 350 kPa, and (b) a $CO_2$ content in a range of from 350 to 1000 ppm.

Aspect 80. The method of aspect 79, wherein the gaseous source mixture has a $CO_2$ content in a range of from 350 to 750 ppm.

Aspect 81. The method of aspect 79, wherein the gaseous source mixture has a $CO_2$ content in a range of from 350 to 600 ppm.

Aspect 82. The method of aspect 79, wherein the gaseous source mixture has a $CO_2$ content in a range of from 350 to 500 ppm.

Aspect 83. The method of aspect 79, wherein the gaseous source mixture has a $CO_2$ content in a range of from 350 to 425 ppm.

Aspect 84. The method of any one of aspects 79-83, wherein the gaseous source mixture has a total pressure in a range of from 50 kPa to 300 kPa.

Aspect 85. The method of any one of aspects 79-83, wherein the gaseous source mixture has a total pressure in a range of from 50 kPa to 250 kPa.

Aspect 86. The method of any one of aspects 79-83, wherein the gaseous source mixture has a total pressure in a range of from 50 kPa to 200 kPa.

Aspect 87. The method of any one of aspects 79-83, wherein the gaseous source mixture has a total pressure in a range of from 50 kPa to 150 kPa.

Aspect 88. The method of any one of aspects 79-83, wherein the gaseous source mixture has a total pressure in a range of from 50 kPa to 125 kPa.

Aspect 89. The method of any one of aspects 79-83, wherein the gaseous source mixture has a total pressure in a range of from 50 kPa to 100 kPa.

Aspect 90. A method of capturing carbon dioxide from a humid gaseous source mixture that comprises water and carbon dioxide, wherein the method comprises contacting the gaseous source mixture first with a desiccant, then with the metal ion-doped crystalline microporous aluminosilicate of any one of aspects 1 to 61, such that such that water in the gaseous source mixture is adsorbed by the desiccant and carbon dioxide in the gaseous source mixture is adsorbed by the metal ion-doped crystalline microporous aluminosilicate.

Aspect 91. The method of aspect 90, wherein the desiccant and the metal ion-doped crystalline microporous aluminosilicate are arranged in sequential layers in a single vessel such that the humid gaseous source mixture passes first through the desiccant layer and then through the metal ion-doped crystalline microporous aluminosilicate layer.

Aspect 92. The method of aspect 90, wherein the desiccant and the metal ion-doped crystalline microporous aluminosilicate are contained in separate vessels such that the humid gaseous source mixture passes first through the desiccant in a first vessel, and then through the metal ion-doped crystalline microporous aluminosilicate in a second vessel.

Aspect 93. The method of aspect 90, wherein regeneration of the desiccant and the metal ion-doped crystalline microporous aluminosilicate is accomplished by passing a regeneration gas first through the metal ion-doped crystalline microporous aluminosilicate and then through to desiccant.

What is claimed:

1. A metal ion-doped crystalline microporous aluminosilicate composition comprising: a three-dimensional aluminosilicate framework having Mazzite topology comprising 12-MR channels and 8-MR cages; wherein the crystalline microporous aluminosilicate contains 2.5 to 14 metal ions per unit cell, wherein the ratio of silicon to aluminum within the unit cell is about 2 to about 4; and wherein the metal ion-doped crystalline microporous aluminosilicate composition adsorbs carbon dioxide when exposed to a gaseous mixture comprising $CO_2$.

2. The metal ion-doped crystalline microporous aluminosilicate composition of claim 1, wherein CO2 concentration of the gaseous mixture is 1000 to 3000 ppm.

3. The metal ion-doped crystalline microporous aluminosilicate composition of claim 1, wherein CO2 concentration of the gaseous mixture is about 400 ppm.

4. The metal ion-doped crystalline microporous aluminosilicate composition of claim 1, wherein the gaseous mixture further comprises oxygen.

5. The metal ion-doped crystalline microporous aluminosilicate composition of claim 1, wherein the gaseous mixture further comprises nitrogen.

6. The metal ion-doped crystalline microporous aluminosilicate composition of claim 1, wherein the composition has a Si:Al atomic ratio in a range of about 3.

7. The composition according to claim 1, wherein the metal ions are alkali metal cations.

8. The composition according to claim 7, wherein the alkali metal cations are $Li^+$, $Na^+$, $K^+$, $Rb^+$, or $Cs^+$.

9. The metal ion-doped crystalline microporous aluminosilicate composition of claim 1, wherein the crystalline microporous aluminosilicate contains 6 to 7 metal ions per unit cell.

10. The composition according to claim 1, wherein the metal ions are alkaline earth metal cations.

11. The composition according to claim 10, wherein the alkali earth metal cations are $Mg^{2+}$, $Ca^{2+}$, $Sr^{2+}$, or $Ba^{2+}$.

12. The composition according to claim 1, wherein the metal ions are transition metal ions.

13. The composition according to claim 1, wherein the metal ions are Zn, Cu, Ni, or Fe ions.

14. The metal ion-doped crystalline microporous aluminosilicate composition of claim 1, wherein the metal ion-doped crystalline microporous aluminosilicate composition adsorbs at least 0.5 mmol of carbon dioxide per gram of metal ion-doped crystalline microporous aluminosilicate composition when exposed to $CO_2$ at a pressure of 0.0004 bar and a temperature of 30° C.

15. The metal ion-doped crystalline microporous aluminosilicate composition of claim 1, wherein the metal ion-doped crystalline microporous aluminosilicate composition adsorbs at least 0.6 mmol of carbon dioxide per gram of metal ion-doped crystalline microporous aluminosilicate composition when exposed to $CO_2$ at a pressure of 0.0004 bar and a temperature of 30° C.

16. The metal ion-doped crystalline microporous aluminosilicate composition of claim 1, wherein the metal ion-doped crystalline microporous aluminosilicate composition adsorbs at least 0.7 mmol of carbon dioxide per gram of metal ion-doped crystalline microporous aluminosilicate composition when exposed to $CO_2$ at a pressure of 0.0004 bar and a temperature of 30° C.

17. The metal ion-doped crystalline microporous aluminosilicate composition of claim 1, wherein passage of a gaseous mixture having (a) a total pressure in a range of from 50 kPa to 350 kPa, and (b) a $CO_2$ content in a range of from 350 to 1000 ppm, through a tube containing a fixed bed of the metal ion-doped crystalline microporous aluminosilicate composition, results in complete breakthrough of $CO_2$ after adsorption of an amount of $CO_2$ (on a mmol/g basis) that is about 1.5-2 times greater than the amount of $CO_2$ adsorbed by an equal weight of zeolite 13× before complete saturation of $CO_2$ occurs under the same conditions.

18. A method of capturing carbon dioxide from a gaseous source mixture that comprises carbon dioxide, the method comprising contacting the gaseous source mixture with the metal ion-doped crystalline microporous aluminosilicate of claim 1 such that carbon dioxide in the gaseous source mixture is adsorbed by the metal ion-doped crystalline microporous aluminosilicate.

19. The method of claim 18, wherein contacting the gaseous source mixture with the metal ion-doped crystalline microporous aluminosilicate comprises passing the gaseous source mixture through a fixed-bed of adsorbent comprising the metal ion-doped crystalline microporous aluminosilicate.

20. The method of claim 18, wherein contacting the gaseous source mixture with the metal ion-doped crystalline microporous aluminosilicate occurs at a temperature of less than 60° C.

21. The method of claim 18, wherein desorption of adsorbed carbon dioxide from the metal ion-doped crystalline microporous aluminosilicate occurs at a temperature of less than 100° C.

22. The method of claim 18, wherein the gaseous source mixture has (a) a total pressure in a range of from 50 kPa to 350 kPa, and (b) a $CO_2$ content in a range of from 350 to 1000 ppm.

23. The method of claim 22, wherein the gaseous source mixture has a $CO_2$ content in a range of from 350 to 750 ppm.

24. The method of claim 22, wherein the gaseous source mixture has a $CO_2$ content in a range of from 350 to 425 ppm.

25. The method of claim 22, wherein the gaseous source mixture has a total pressure in a range of from 50 kPa to 300 kPa.

26. A method of capturing carbon dioxide from a humid gaseous source mixture that comprises water and carbon dioxide, wherein the method comprises contacting the gaseous source mixture first with a desiccant, then with the metal ion-doped crystalline microporous aluminosilicate of claim 1, such that such that water in the gaseous source mixture is adsorbed by the desiccant and carbon dioxide in the gaseous source mixture is adsorbed by the metal ion-doped crystalline microporous aluminosilicate.

* * * * *